US012706367B2

(12) United States Patent
Seki et al.

(10) Patent No.: US 12,706,367 B2
(45) Date of Patent: Aug. 11, 2026

(54) DIRECTIONAL COUPLER, HIGH FREQUENCY MODULE, AND COMMUNICATION DEVICE

(71) Applicant: Murata Manufacturing Co., Ltd., Kyoto (JP)

(72) Inventors: Kenta Seki, Kyoto (JP); Ryangsu Kim, Kyoto (JP); Kazuhito Osawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 125 days.

(21) Appl. No.: 18/754,898

(22) Filed: Jun. 26, 2024

(65) Prior Publication Data

US 2024/0347890 A1 Oct. 17, 2024

Related U.S. Application Data

(63) Continuation of application No. PCT/JP2022/047436, filed on Dec. 22, 2022.

(30) Foreign Application Priority Data

Dec. 27, 2021 (JP) ................................ 2021-213284

(51) Int. Cl.

*H01P 5/18* (2006.01)
*H01P 1/18* (2006.01)
*H01Q 5/50* (2015.01)

(52) U.S. Cl.

CPC ................ *H01P 5/187* (2013.01); *H01P 1/18* (2013.01); *H01P 5/185* (2013.01); *H01P 5/188* (2013.01); *H01Q 5/50* (2015.01)

(58) Field of Classification Search

CPC . H01P 5/185; H01P 5/187; H01P 5/18; H03H 7/0115
USPC ......................... 333/101, 111, 175, 258, 262
See application file for complete search history.

(56) References Cited

U.S. PATENT DOCUMENTS 10,498,004 B1 * 12/2019 Ji .............................. H01P 5/18
10,964,996 B2 * 3/2021 Kim .......................... H01P 5/04
2016/0172739 A1 6/2016 Srirattana et al.
2017/0324393 A1 * 11/2017 Karthaus ................ H03H 7/463
2018/0062672 A1 3/2018 Kim
(Continued)

FOREIGN PATENT DOCUMENTS

JP 2017-537555 A 12/2017
JP 2018-037780 A 3/2018
(Continued)

OTHER PUBLICATIONS

International Search Report for PCT/JP2022/047436 dated Mar. 14, 2023.

*Primary Examiner* — Rakesh B Patel
(74) *Attorney, Agent, or Firm* — McDonald Hopkins LLC

(57) ABSTRACT

Degrees of a change in an insertion loss of a main line and a change in a phase of a signal are small regardless of whether or not detection is performed by using a sub-line. A directional coupler includes a main line, a sub-line, a first termination circuit, a second termination circuit, and a switch. The sub-line has a first end and a second end. The first termination circuit terminates the first end and the second end of the sub-line. The switch switches connection and disconnection between the sub-line and the first termination circuit.

9 Claims, 12 Drawing Sheets

(56) References Cited

U.S. PATENT DOCUMENTS

| | | | |
|---|---|---|---|
| 2021/0036396 | A1 | 2/2021 | Seki et al. |
| 2021/0336647 | A1 | 10/2021 | Yamaguchi |

FOREIGN PATENT DOCUMENTS

| | | | |
|---|---|---|---|
| JP | 2021-027426 | A | 2/2021 |
| JP | 2021-174854 | A | 11/2021 |

* cited by examiner

DIRECTIONAL COUPLER, HIGH FREQUENCY MODULE, AND COMMUNICATION DEVICE

CROSS REFERENCE TO RELATED APPLICATION

This is a continuation of International Application No. PCT/JP2022/047436 filed on Dec. 22, 2022 which claims priority from Japanese Patent Application No. 2021-213284 filed on Dec. 27, 2021. The contents of these applications are incorporated herein by reference in their entireties.

BACKGROUND ART

Technical Field

The present disclosure generally relates to a directional coupler, a high frequency module, and a communication device, and in more detail, relates to a directional coupler including a main line and a plurality of sub-lines, a high frequency module including a directional coupler, and a communication device including a high frequency module.

Patent Document 1 discloses a bidirectional coupler including a main line, a sub-line, a first resistor and a second resistor, and a first switch and a second switch. The first switch connects a first end, which is one end of the sub-line, to a detection port or the first resistor. The second switch connects a second end, which is the other end of the sub-line, to the detection port or the second resistor. The first resistor has one end grounded, and the other end connected to the first switch. The second resistor has one end grounded, and the other end connected to the second switch. In the bidirectional coupler, in a case in which a signal supplied from an input port of the main line is detected, the second switch is switched to the detection port side, and the first switch is switched to the first resistor side. On the other hand, in the bidirectional coupler, in a case in which a signal supplied from an output port of the main line is detected, the first switch is switched to the detection port side, and the second switch is switched to the second resistor side.

Patent Document 1: Japanese Unexamined Patent Application Publication No. 2018-37780

BRIEF SUMMARY

In the bidirectional coupler described in Patent Document 1, in a case in which the sub-line and the detection port are not connected to each other, the sub-line is in an open state in which the sub-line is not connected to any circuit. Even though the sub-line is in the open state, a part of a signal transmitted on the main line may leak from the main line to the other sub-line in the open state, and a signal loss may occur. In this case, an impedance of the sub-line is different between a case in which the sub-line is in the open state and a case in which the sub-line is connected to the detection port. Therefore, there may be a case in which an insertion loss and a phase of a signal of the main line are different between a case in which the sub-line is in the open state and a case in which the sub-line is connected to the detection port.

The present disclosure provides a directional coupler, a high frequency module, and a communication device in which degrees of a change in an insertion loss of a main line and a change in a phase of a signal are small regardless of whether or not detection is performed by using a sub-line.

An aspect of the present disclosure provides a directional coupler including a main line, a sub-line, a first termination circuit and a second termination circuit, and a switch. The sub-line has a first end and a second end. The first termination circuit and the second termination circuit terminate the first end and the second end of the sub-line. The switch switches connection and disconnection between the sub-line and the first termination circuit.

An aspect of the present disclosure provides a high frequency module including the directional coupler, an antenna terminal, a plurality of filters, and an antenna switch. The antenna switch switches connection and disconnection between a first signal path leading to the antenna terminal and each of a plurality of second signal paths leading to the plurality of filters.

An aspect of the present disclosure provides a communication device including the high frequency module, and a signal processing circuit. The signal processing circuit is connected to the high frequency module and performs signal processing on a high frequency signal.

With the directional coupler, the high frequency module, and the communication device according to the aspects of the present disclosure, the degrees of the change in the insertion loss of the main line and the change in the phase of the signal can be reduced regardless of whether or not the detection is performed by using the sub-line.

DETAILED DESCRIPTION

Figure 16:
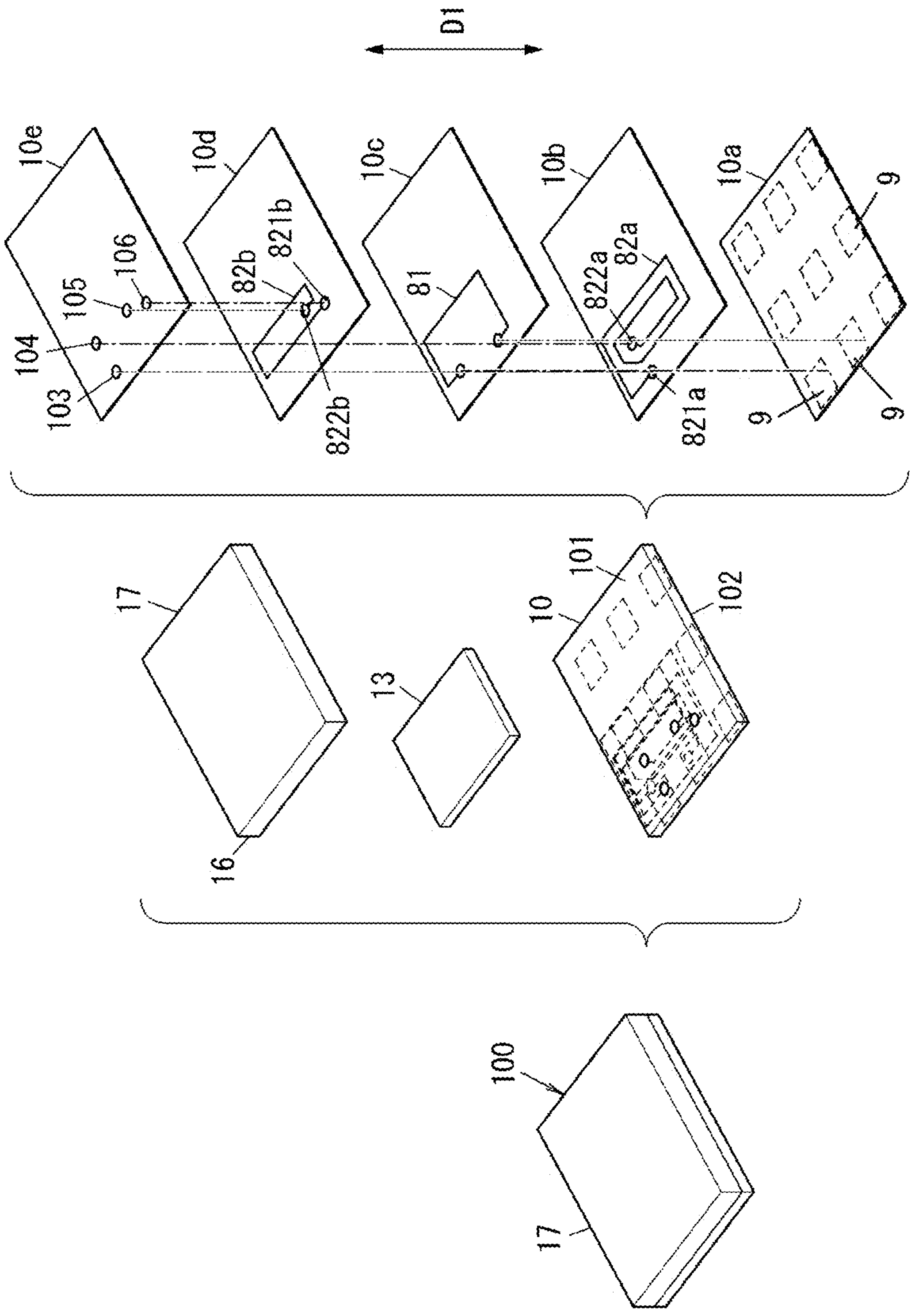
FIG. 16 is a perspective view of the high frequency module.
Figure 17:
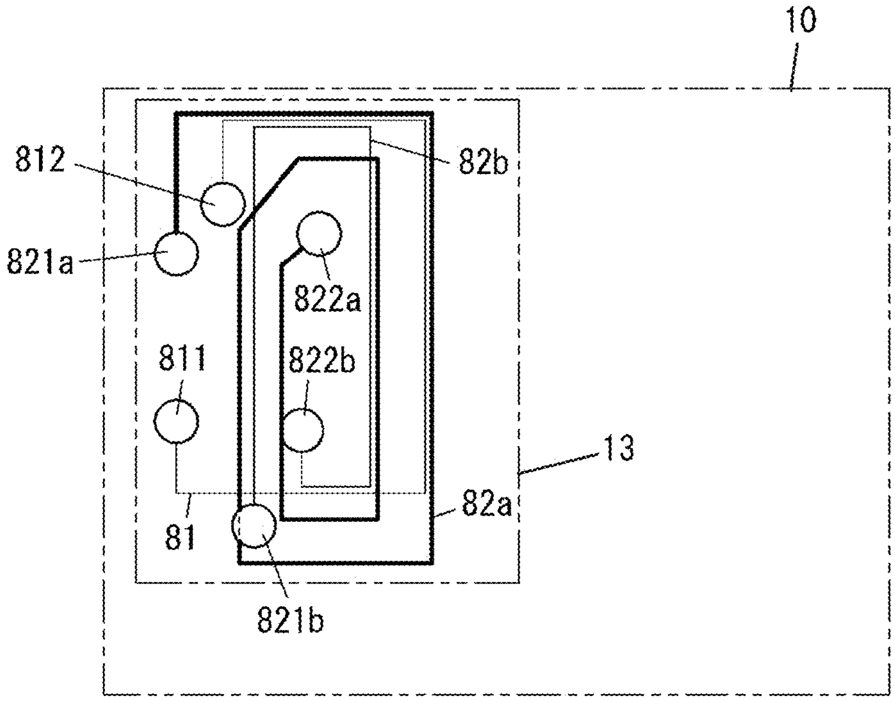
FIG. 17 is a plan view related to the high frequency module and illustrating a positional relationship of a main line, a first sub-line, and a second sub-line, and an IC chip.

FIGS. 16 and 17, which are referred to in the following embodiments or the like, are all schematic diagrams, and a ratio of respective sizes or thicknesses of the components in the drawing does not necessarily reflect an actual dimensional ratio.

Embodiment 1

(1) Configuration of Directional Coupler

A configuration of a directional coupler 8 according to Embodiment 1 will be described with reference to FIGS. 1 to 3.

The directional coupler 8 according to Embodiment 1 is used in, for example, a high frequency module of a communication device. As illustrated in FIG. 1, the directional coupler 8 is a device that extracts, as a detected signal, a part of a high frequency signal transmitted on a partial section (main line 81) of a signal path in the high frequency module from a sub-line 82. By monitoring the detected signal, it is possible to monitor the high frequency signal transmitted through the main line 81. The directional coupler 8 according to Embodiment 1 is a bidirectional coupler configured to detect any one of the high frequency signal and a reflected signal by extracting the detected signal from any one of a first end 821 and a second end 822 that are both ends of the sub-line 82.

The directional coupler 8 includes the main line 81, the sub-line 82, a first termination circuit 84, a second termination circuit 83, a first changeover switch 85*a*, a second changeover switch 85*b*, a third changeover switch 86*a*, a fourth changeover switch 86*b*, a fifth changeover switch 88*a*, and a sixth changeover switch 88*b*. The directional coupler 8 further includes a plurality (three in the illustrated example) of connection terminals 87. The plurality of connection terminals 87 include a first connection terminal 871, a second connection terminal 872, and a third connection terminal 873.

(1.1) Main Line

The main line 81 has a first end 811 and a second end 812 that are both ends of the main line 81 in a longitudinal direction. The first end 811 of the main line 81 is connected to the first connection terminal 871. The first end 811 of the main line 81 is connected to, for example, an antenna terminal of the high frequency module with the first connection terminal 871 interposed therebetween. The second end 812 of the main line 81 is connected to the second connection terminal 872. The second end 812 of the main line 81 is connected to, for example, a transmission circuit, a reception circuit, or a transmission/reception circuit of the high frequency module with the second connection terminal 872 interposed therebetween.

(1.2) Sub-Line

The sub-line 82 has a first end 821 and a second end 822 that are both ends of the sub-line 82 in a longitudinal direction. The first end 821 of the sub-line 82 is connected to the first changeover switch 85*a* and the second changeover switch 85*b*, which will be described below. More specifically, the first end 821 of the sub-line 82 is connected to a terminal 851 of the first changeover switch 85*a* and a terminal 853 of the second changeover switch 85*b*. The first end 821 of the sub-line 82 is connected to the fifth changeover switch 88*a*, which will be described below. More specifically, the first end 821 of the sub-line 82 is connected to a terminal 881 of the fifth changeover switch 88*a*. The second end 822 of the sub-line 82 is connected to the third changeover switch 86*a* and the fourth changeover switch 86*b*, which will be described below. More specifically, the second end 822 of the sub-line 82 is connected to a terminal 861 of the third changeover switch 86*a* and a terminal 863 of the fourth changeover switch 86*b*. The second end 822 of the sub-line 82 is connected to the sixth changeover switch 88*b*. More specifically, the second end 822 of the sub-line 82 is connected to a terminal 883 of the sixth changeover switch 88*b*. The sub-line 82 is, for example, electromagnetically coupled to the main line 81.

(1.3) Second Termination Circuit

The second termination circuit 83 is a circuit that terminates the sub-line 82 in a first mode and a second mode in which the signal transmitted through the main line 81 is detected by using the sub-line 82. The first mode is a detection mode in which the signal transmitted in the main line 81 from the first end 811 to the second end 812 of the main line 81 is detected. The second mode is a detection mode in which the signal transmitted in the main line 81 from the second end 812 of the main line 81 to the first end 811 is detected. The second termination circuit 83 is connected between a terminal 852 of the first changeover switch 85*a* and a terminal 864 of the fourth changeover switch 86*b*, and the ground. The second termination circuit 83 is, for example, a circuit in which a capacitor 831 and a resistor 832 are connected parallel to each other. The second termination circuit 83 includes, for example, a switch 833, a switch 834, and a switch 835. The switch 833 is connected between the capacitor 831 and the ground, and switches a short-circuit state and an open state between the capacitor 831 and the ground. The switch 834 is connected between the resistor 832 and the ground, and switches the short-circuit state and the open state between the resistor 832 and the ground. The switch 835 is connected between the terminal 852 of the first changeover switch 85*a* and the terminal 864 of the fourth changeover switch 86*b*, and the ground. The switch 835 switches the short-circuit state and the open state between the terminal 852 of the first changeover switch 85*a* and the terminal 864 of the fourth changeover switch 86*b*, and the ground.

(1.4) First Termination Circuit

The first termination circuit 84 is a circuit that terminates the first end 821 and the second end 822, which are both ends of the sub-line 82, in a third mode in which the detection using the sub-line 82 is not performed. More specifically, the first termination circuit 84 is a pseudo termination circuit for adjusting an impedance of the sub-line 82 for the signal transmitted through the main line 81 in the third mode to the same degree as an impedance of the sub-line 82 in the first mode and the second mode. The first termination circuit 84 includes a first circuit 841 connected to the first end 821 of the sub-line 82, and a second circuit 842 connected to the second end 822 of the sub-line 82. The first circuit 841 is connected between a terminal 882 of the fifth changeover switch 88*a* and the ground. More specifically, the first circuit 841 has a first end 8411 connected to the terminal 882 of the fifth changeover switch 88*a*. The first circuit 841 has a second end 8412 connected to the ground. The first circuit 841 includes, for example, a resistor 8431. The second circuit 842 is connected between a terminal 884 of the sixth changeover switch 88*b* and the ground. More specifically, the second circuit 842 has a first end 8421 connected to the terminal 884 of the sixth changeover switch 88*b*. The second circuit 842 has a second end 8422 connected to the ground. The second circuit 842 has the same configuration as the first circuit 841, and includes, for example, the resistor 8431.

(1.5) First Changeover Switch and Second Changeover Switch

The first changeover switch 85*a* and the second changeover switch 85*b* are switches for switching the connection destination of the first end 821 of the sub-line 82. The first changeover switch 85*a* has the two terminals 851 and 852. The terminal 851 is connected to the first end 821 of the sub-line 82. The terminal 852 is connected to the second termination circuit 83. The second changeover switch 85*b* has the two terminals 853 and 854. The terminal 853 is connected to the first end 821 of the sub-line 82. The terminal 854 is connected to the third connection terminal 873.

The first changeover switch 85*a* switches a first state in which the terminal 851 and the terminal 852 are connected to each other, and a second state in which the terminal 851 and the terminal 852 are opened. More specifically, the first changeover switch 85*a* connects the terminal 851 and the terminal 852 to each other in the first mode, and opens the terminal 851 and the terminal 852 in the second mode and the third mode.

The second changeover switch 85*b* switches a first state in which the terminal 853 and the terminal 854 are connected to each other, and a second state in which the terminal 853 and the terminal 854 are connected to each other. More specifically, the second changeover switch 85*b* connects the terminal 853 and the terminal 854 to each other in the second mode, and opens the terminal 853 and the terminal 854 in the first mode and the third mode.

Accordingly, in the first mode, the first end 821 of the sub-line 82 is connected to the second termination circuit 83. In the second mode, the first end 821 of the sub-line 82 is connected to the third connection terminal 873. In the third mode, the first end 821 of the sub-line 82 is not connected to both the second termination circuit 83 and the third connection terminal 873.

(1.6) Third Changeover Switch and Fourth Changeover Switch

The third changeover switch 86*a* and the fourth changeover switch 86*b* are switches for switching the connection destination of the second end 822 of the sub-line 82. The third changeover switch 86*a* has the two terminals 861 and 862. The terminal 861 is connected to the second end 822 of the sub-line 82. The terminal 862 is connected to the third connection terminal 873. The fourth changeover switch 86*b* has the two terminals 863 and 864. The terminal 863 is connected to the second end 822 of the sub-line 82. The terminal 864 is connected to the second termination circuit 83.

The third changeover switch 86*a* switches a first state in which the terminal 861 and the terminal 862 are connected to each other, and a second state in which the terminal 861 and the terminal 862 are opened. More specifically, the third changeover switch 86*a* connects the terminal 861 and the terminal 862 to each other in the first mode, and opens the terminal 861 and the terminal 862 in the second mode and the third mode.

The fourth changeover switch 86*b* switches a first state in which the terminal 863 and the terminal 864 are connected to each other, and a second state in which the terminal 863 and the terminal 864 are opened. More specifically, the fourth changeover switch 86*b* connects the terminal 863 and the terminal 864 to each other in the second mode, and opens the terminal 863 and the terminal 864 in the first mode and the third mode.

Accordingly, in the first mode, the second end 822 of the sub-line 82 is connected to the third connection terminal 873. In the second mode, the second end 822 of the sub-line 82 is connected to the second termination circuit 83. In the third mode, the second end 822 of the sub-line 82 is not connected to both the second termination circuit 83 and the third connection terminal 873.

(1.7) Fifth Changeover Switch and Sixth Changeover Switch

The fifth changeover switch 88*a* and the sixth changeover switch 88*b* are switches for switching between connection and opening between the first end 821 and the second end 822 of the sub-line 82, and the first termination circuit 84. The fifth changeover switch 88*a* has the two terminals 881 and 882. The terminal 881 is connected to the first end 821 of the sub-line 82. The terminal 882 is connected to the first end 8411 of the first circuit 841 of the first termination circuit 84. The sixth changeover switch 88*b* has the two terminals 883 and 884. The terminal 883 is connected to the second end 822 of the sub-line 82. The terminal 884 is connected to the first end 8421 of the second circuit 842 of the first termination circuit 84.

The fifth changeover switch 88*a* switches a first state in which the terminal 881 and the terminal 882 are connected to each other, and a second state in which the terminal 881 and the terminal 882 are opened. More specifically, the fifth changeover switch 88*a* connects the terminal 881 and the terminal 882 to each other in the third mode, and opens the terminal 881 and the terminal 882 in the first mode and the second mode.

The sixth changeover switch 88*b* switches a first state in which the terminal 883 and the terminal 884 are connected to each other, and a second state in which the terminal 883 and the terminal 884 are opened. More specifically, the sixth changeover switch 88*b* connects the terminal 883 and the terminal 884 to each other in the third mode, and opens the terminal 883 and the terminal 884 in the first mode and the second mode.

Accordingly, in the third mode, the first end 821 of the sub-line 82 is connected to the first end 8411 of the first circuit 841 of the first termination circuit 84, and the second end 822 of the sub-line 82 is connected to the first end 8421 of the second circuit 842 of the first termination circuit 84.

In the first mode and the second mode, the sub-line 82 is not connected to the first termination circuit 84.

(2) Operation

As described above, the directional coupler 8 has the first mode, the second mode, and the third mode. The first mode is a mode in which the signal transmitted through the main line 81 from the first end 811 to the second end 812 is detected. The second mode is a mode in which the signal transmitted through the main line 81 from the second end 812 to the first end 811 is detected. The third mode is a mode in which the detection using the sub-line 82 is not performed on the signal transmitted through the main line 81.

(2.1) First Mode

Figure 1:
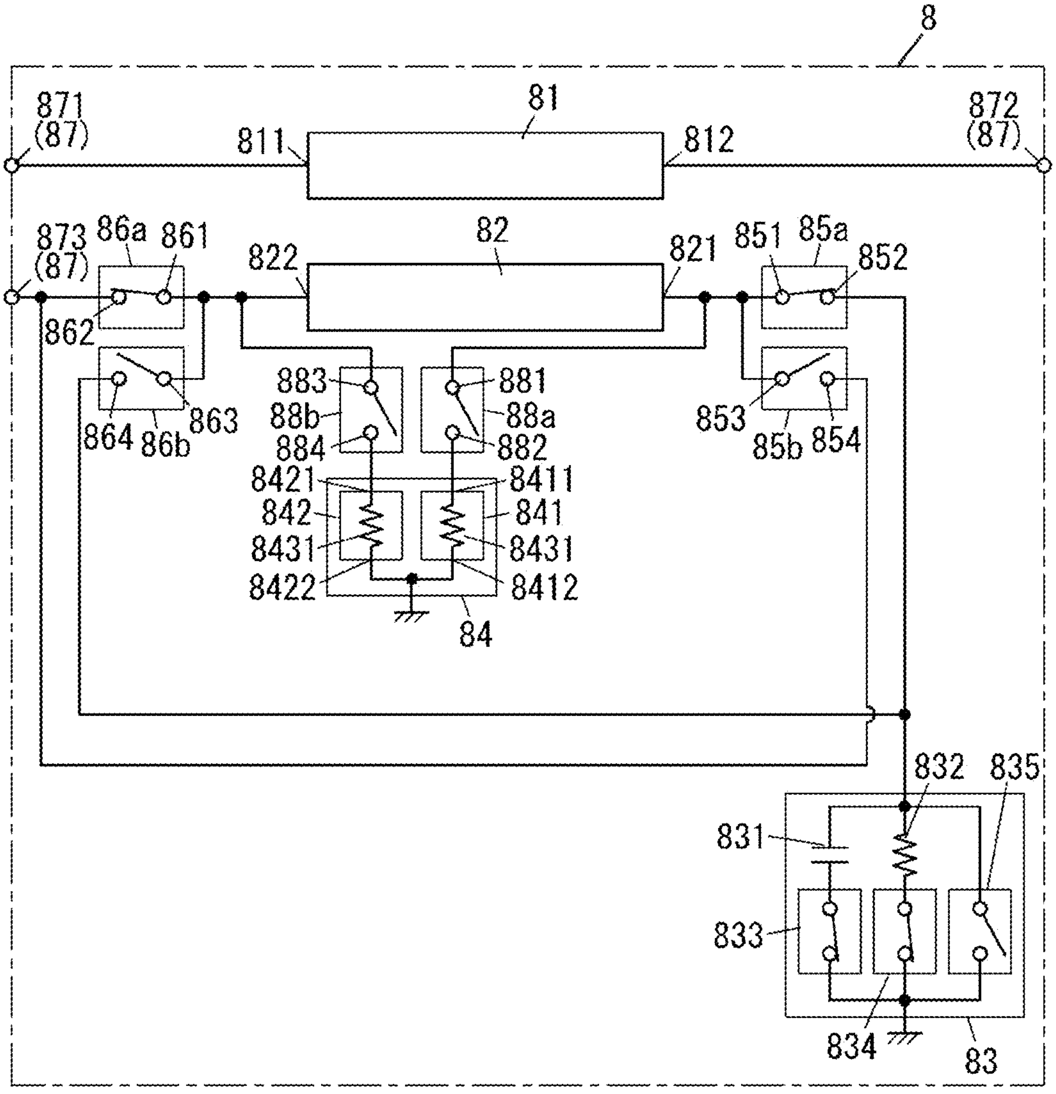
FIG. 1 is a circuit diagram illustrating a first mode of a directional coupler according to Embodiment 1.

In the first mode, as illustrated in FIG. 1, the directional coupler 8 connects the terminal 851 and the terminal 852 of the first changeover switch 85*a* to each other, and connects the terminal 861 and the terminal 862 of the third changeover switch 86*a* to each other. In the first mode, the directional coupler 8 opens the terminal 853 and the terminal 854 of the second changeover switch 85*b*, and opens the terminal 863 and the terminal 864 of the fourth changeover switch 86*b*. In the first mode, the directional coupler 8 opens the terminal 881 and the terminal 882 of the fifth changeover switch 88*a*, and opens the terminal 883 and the terminal 884 of the sixth changeover switch 88*b*. Accordingly, in the first mode, the first end 821 of the sub-line 82 is connected to the second termination circuit 83, and the second end 822 of the sub-line 82 is connected to the third connection terminal 873.

In the first mode, the directional coupler 8 detects the signal (transmission signal or reception signal) transmitted through the main line 81 from the first end 811 to the second end 812 by using the sub-line 82, and outputs the detected signal to an external device (for example, a detector) with the third connection terminal 873 interposed therebetween.

(2.2) Second Mode

Figure 2:
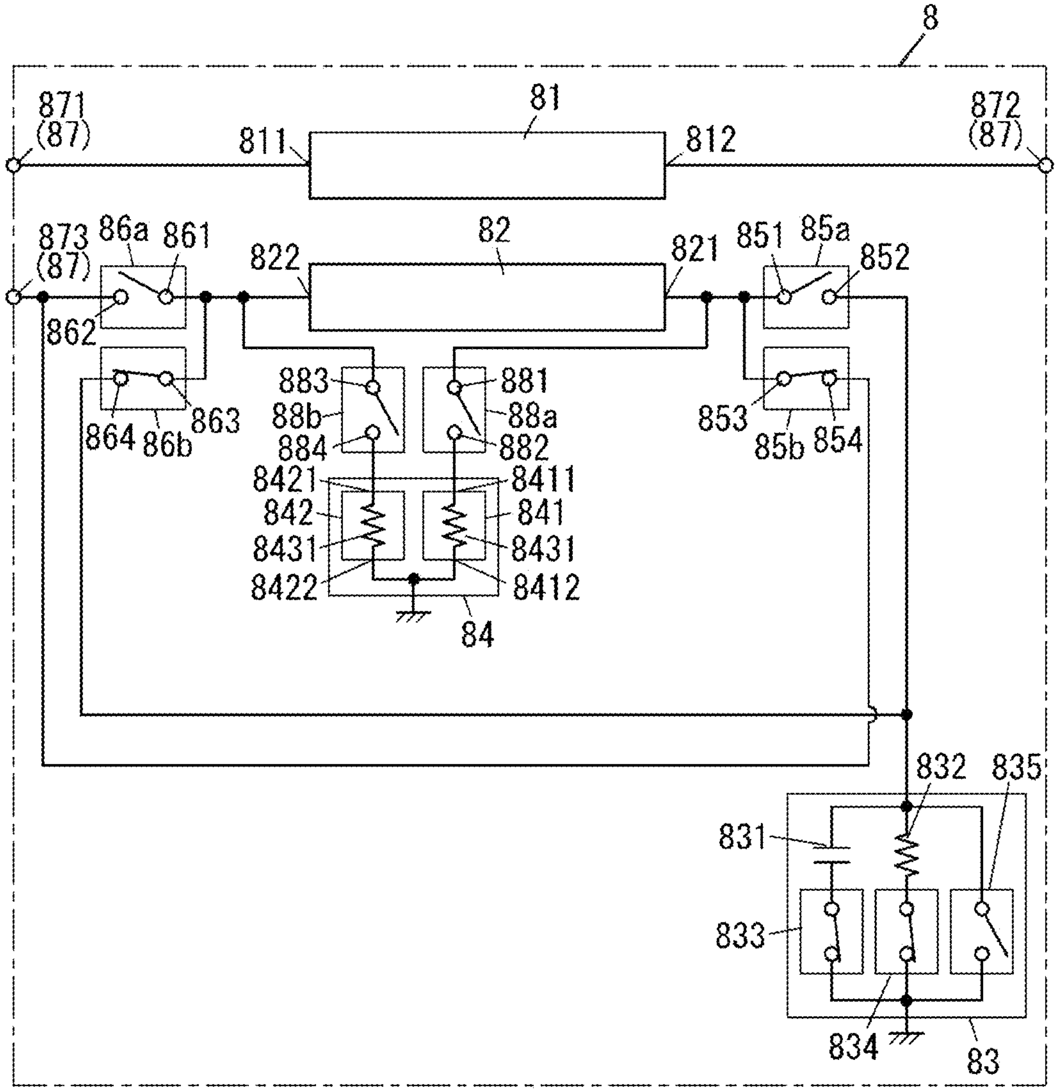
FIG. 2 is a circuit diagram illustrating a second mode of the directional coupler.

In the second mode, as illustrated in FIG. 2, the directional coupler 8 connects the terminal 853 and the terminal 854 of the second changeover switch 85*b* to each other, and connects the terminal 863 and the terminal 864 of the fourth changeover switch 86*b* to each other. In the second mode, the directional coupler 8 opens the terminal 851 and the terminal 852 of the first changeover switch 85*a*, and opens the terminal 861 and the terminal 862 of the third changeover switch 86*a*. In the second mode, the directional coupler 8 opens the terminal 881 and the terminal 882 of the fifth changeover switch 88*a*, and opens the terminal 883 and the terminal 884 of the sixth changeover switch 88*b*. Accordingly, in the second mode, the first end 821 of the sub-line 82 is connected to the third connection terminal 873, and the second end 822 of the sub-line 82 is connected to the second termination circuit 83.

In the second mode, the directional coupler 8 detects the signal (transmission signal or reception signal) transmitted through the main line 81 from the second end 812 to the first end 811 by using the sub-line 82, and outputs the detected signal to the external device (for example, the detector) with the third connection terminal 873 interposed therebetween.

(2.3) Third Mode

Figure 3:
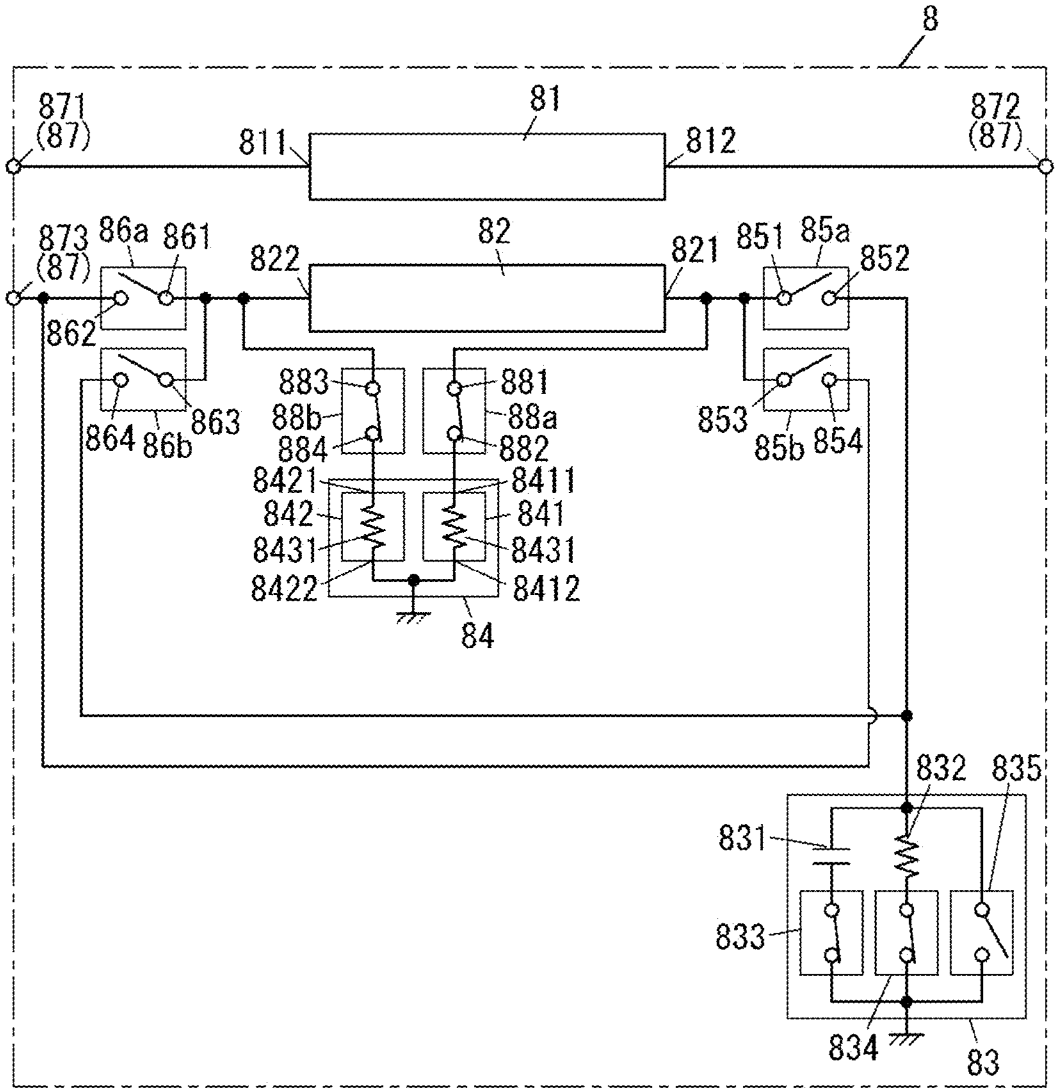
FIG. 3 is a circuit diagram illustrating a third mode of the directional coupler.

In the third mode, as illustrated in FIG. 3, the directional coupler 8 connects the terminal 881 and the terminal 882 of the fifth changeover switch 88*a* to each other, and connects the terminal 883 and the terminal 884 of the sixth changeover switch 88*b* to each other. In the third mode, the directional coupler 8 opens the terminal 851 and the terminal 852 of the first changeover switch 85*a*, and opens the terminal 853 and the terminal 854 of the second changeover switch 85*b*. In the third mode, the directional coupler 8 opens the terminal 861 and the terminal 862 of the third changeover switch 86*a*, and opens the terminal 863 and the terminal 864 of the fourth changeover switch 86*b*. Accordingly, in the third mode, the first end 821 of the sub-line 82 is connected to the first end 8411 of the first circuit 841 of the first termination circuit 84, and the second end 822 of the sub-line 82 is connected to the first end 8421 of the second circuit 842 of the first termination circuit 84.

In the third mode, the directional coupler 8 terminates the sub-line 82 via the first termination circuit 84. More specifically, the first circuit 841 terminates the first end 821 of the sub-line 82, and the second circuit 842 terminates the second end 822 of the sub-line 82. Accordingly, the sub-line 82 has an impedance corresponding to the first circuit 841 and the second circuit 842 of the first termination circuit 84 for the high frequency signal transmitted through the main line 81. Therefore, it is possible to make the insertion losses of the main line 81 of the directional coupler 8 and the phases of the high frequency signal transmitted through the main line 81 close to each other between the first mode and the second mode, and the third mode. As a result, it is possible to suppress the fluctuations in the insertion loss of the main line 81 and the phase of the high frequency signal transmitted through the main line 81, the fluctuations depending on the mode of the directional coupler 8.

(3) Insertion Loss and Phase Characteristics of Directional Coupler

The insertion loss of the directional coupler 8 according to Embodiment 1 will be described in comparison with the directional coupler in the related art.

Figure 4A:
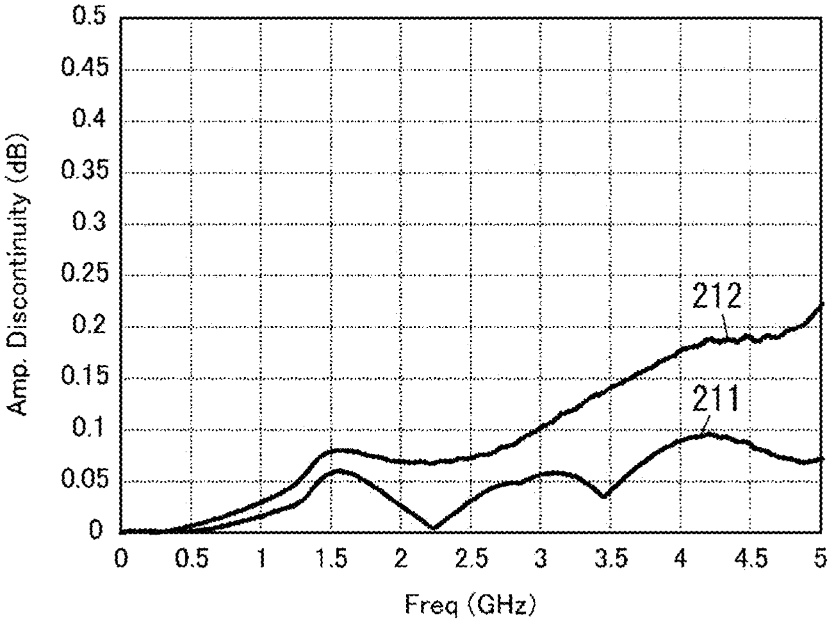
FIG. 4A is a graph illustrating an insertion loss of the same directional coupler and a directional coupler in the related art.

FIG. 4A is a graph illustrating a difference in the insertion loss of the main line between a case in which the detection using the sub-line is performed and a case in which the detection using the sub-line is not performed, for the directional coupler 8 and the directional coupler in the related art. In FIG. 4A, a horizontal axis represents a frequency of the high frequency signal transmitted on the main line. In FIG. 4A, a vertical axis represents a difference between the insertion loss of the main line in a case in which the detection is performed by connecting the sub-line to the external device (detector), and the insertion loss of the main line in a case in which the sub-line and the external device (detector) are opened. More specifically, data 211 in FIG. 4A indicates a difference between the insertion loss of the main line 81 in the first mode and the insertion loss of the main line 81 in the third mode, in Embodiment 1. On the other hand, data 212 in FIG. 4A indicates a difference between the insertion loss of the main line in a case in which the sub-line is used for the detection in the directional coupler in the related art, and the insertion loss of the main line in a case in which the sub-line is not used for the detection. A case in which the sub-line is not used for the detection means, more specifically, a state in which both the first end and the second end of the sub-line are opened.

As illustrated in FIG. 4A, in the directional coupler 8 according to Embodiment 1, the difference between the insertion loss of the main line 81 in the third mode and the insertion loss of the main line 81 in the first mode is smaller than the difference between the insertion loss of the main line in the case in which the sub-line is used for the detection and the insertion loss of the main line in the case in which the sub-line is not used for the detection in the directional coupler in the related art. That is, in the directional coupler 8 according to Embodiment 1, it is possible to suppress the fluctuation in the insertion loss of the main line 81, the fluctuation depending on a use state (mode) of the sub-line 82.

Figure 4B:
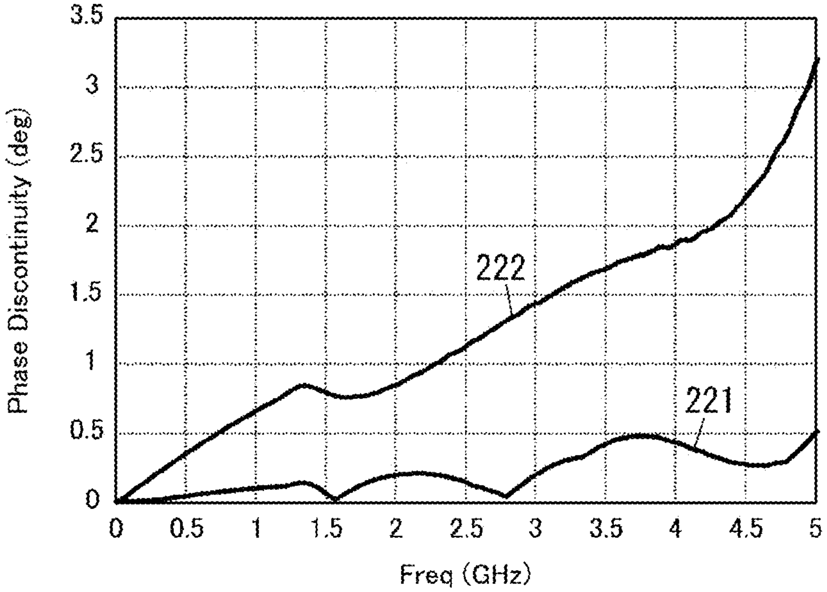
FIG. 4B is a graph illustrating a phase of a signal transmitted through a main line between the directional coupler and the directional coupler in the related art.

In addition, FIG. 4B is a graph illustrating a phase change of the high frequency signal transmitted through the main line in a case in which the detection using the sub-line is performed and in a case in which the detection using the sub-line is not performed, for the directional coupler 8 and the directional coupler in the related art. In FIG. 4B, a horizontal axis represents a frequency of the high frequency signal transmitted on the main line. In FIG. 4B, a vertical axis represents a phase difference between the high frequency signal transmitted through the main line in a case in which the detection is performed by connecting the sub-line to the external device (detector), and the high frequency signal transmitted through the main line in a case in which the sub-line and the external device (detector) are opened. More specifically, data 221 in FIG. 4B indicates a difference between the phase of the high frequency signal transmitted through the main line 81 in the first mode, and the phase of the high frequency signal transmitted through the main line 81 in the third mode in Embodiment 1. On the other hand, data 222 in FIG. 4B indicates a difference between the phase of the high frequency signal transmitted through the main line in a case in which the sub-line is used for the detection in the directional coupler in the related art, and the phase of the high frequency signal transmitted through the main line in a case in which the sub-line is not used for the detection.

As illustrated in FIG. 4B, in the directional coupler 8 according to Embodiment 1, the difference between the phase of the high frequency signal transmitted through the main line 81 in the third mode and the phase of the high frequency signal transmitted through the main line 81 in the first mode is smaller than the difference between the phase of the high frequency signal transmitted through the main line 81 in a case in which the sub-line is used for the detection in the directional coupler in the related art and the phase of the high frequency signal transmitted through the main line 81 in a case in which the sub-line is not used for the detection. That is, in the directional coupler 8 according to Embodiment 1, it is possible to suppress the fluctuation of the phase of the high frequency signal transmitted through the main line 81, the fluctuation depending on the use state (mode) of the sub-line 82.

(4) Effect

In the directional coupler 8 according to Embodiment 1, as described above, in the third mode, the first termination circuit 84 terminates the sub-line 82. Accordingly, it is possible to reduce the difference in the impedance of the sub-line 82 for the high frequency signal transmitted through the main line 81 between the first mode and the second mode, and the third mode. In particular, since each of the first circuit 841 and the second circuit 842 of the first termination circuit 84 is connected to the ground, even in a case in which the frequency of the high frequency signal transmitted through the main line 81 is high, it is possible to reduce the difference in the impedance of the sub-line 82 for the high frequency signal transmitted through the main line 81 between the first mode and the second mode, and the third mode.

That is, with the configuration of Embodiment 1, the difference in the insertion loss of the main line 81 and the phase difference of the high frequency signal transmitted through the main line 81 between the first mode and the second mode and the third mode are reduced. Therefore, it is possible to suppress the changes in the insertion loss of the main line 81 and the phase of the high frequency signal transmitted through the main line 81, the changes depending on the mode of the directional coupler 8. It is possible to reduce a difference between the signal transmitted through the main line 81 obtained by the detection in the first mode and the second mode and the signal transmitted through the main line 81 in the third mode, and to improve the accuracy of the detection.

(5) Modification Example

The directional coupler 8 according to Embodiment 1 may include any one of first termination circuits 84*a* to 84*d* instead of the first termination circuit 84.

Figure 5:
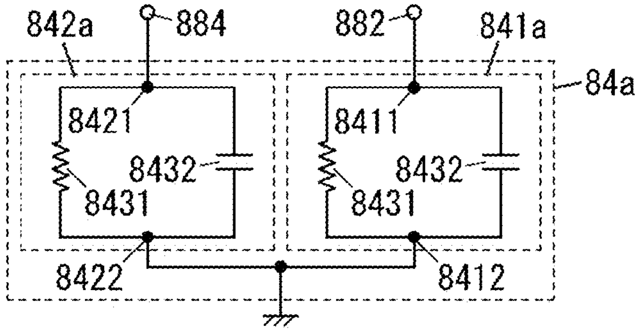
FIG. 5 is a circuit diagram illustrating a modification example of a first termination circuit used in the directional coupler.

A first circuit 841*a* of the first termination circuit 84*a* has a first end 8411 connected to the terminal 882 (see FIG. 1) of the fifth changeover switch 88*a*, and a second end 8412 connected to the ground. As illustrated in FIG. 5, the first circuit 841*a* includes the resistor 8431 and a capacitor 8432, for example. The resistor 8431 and the capacitor 8432 are connected parallel to each other. More specifically, each of the resistor 8431 and the capacitor 8432 has one end (first end) connected to the first end 8411 of the first circuit 841*a*, and the other end (second end) connected to the second end 8412 of the first circuit 841*a*. The first termination circuit 84*a* includes a second circuit 842*a* having the same configuration as the first circuit 841*a*. The second circuit 842*a* has the first end 8421 connected to the terminal 884 of the sixth changeover switch 88*b* (see FIG. 1), and the second end 8422 connected to the ground.

Figure 6:
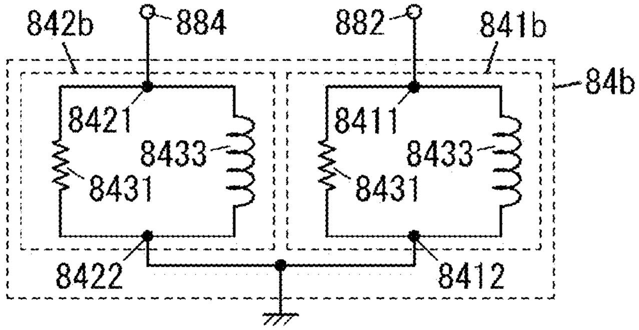
FIG. 6 is a circuit diagram illustrating another modification example of the first termination circuit used in the directional coupler.

A first circuit 841*b* of the first termination circuit 84*b* has the first end 8411 connected to the terminal 882 (see FIG. 1) of the fifth changeover switch 88*a*, and the second end 8412 connected to the ground. The first circuit 841*b* includes, for example, the resistor 8431 and an inductor 8433, as illustrated in FIG. 6. The resistor 8431 and the inductor 8433 are connected parallel to each other. More specifically, each of the resistor 8431 and the inductor 8433 has one end (first end) connected to the first end 8411 of the first circuit 841*b*, and the other end (second end) connected to the second end 8412 of the first circuit 841*b*. The first termination circuit 84*b* includes a second circuit 842*b* having the same configuration as the first circuit 841*b*. The second circuit 842*b* has the first end 8421 connected to the terminal 884 of the sixth changeover switch 88*b* (see FIG. 1), and the second end 8422 connected to the ground.

Figure 7:
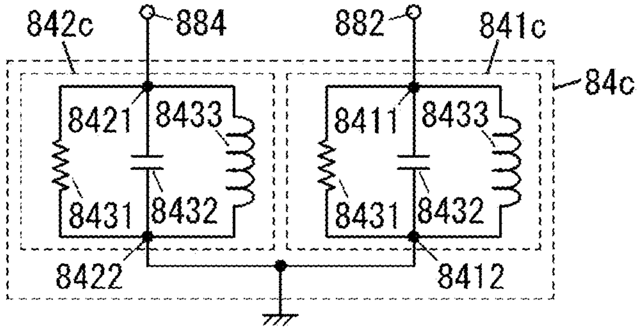
FIG. 7 is a circuit diagram illustrating still another modification example of the first termination circuit used in the directional coupler.

A first circuit 841*c* of the first termination circuit 84*c* has the first end 8411 connected to the terminal 882 (see FIG. 1) of the fifth changeover switch 88*a*, and the second end 8412 connected to the ground. The first circuit 841*c* includes, for example, the resistor 8431, the capacitor 8432, and the inductor 8433, as illustrated in FIG. 7. The resistor 8431, the capacitor 8432, and the inductor 8433 are connected parallel to each other. More specifically, each of the resistor 8431, the capacitor 8432, and the inductor 8433 has one end (first end) connected to the first end 8411 of the first circuit 841*c*, and the other end (second end) connected to the second end 8412 of the first circuit 841*c*. The first termination circuit

84*c* includes a second circuit 842*c* having the same configuration as the first circuit 841*c*. The second circuit 842*c* has the first end 8421 connected to the terminal 884 of the sixth changeover switch 88*b* (see FIG. 1), and the second end 8422 connected to the ground.

Figure 8:
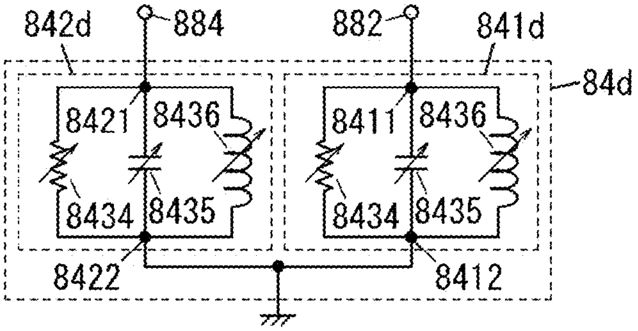
FIG. 8 is a circuit diagram illustrating still another modification example of the first termination circuit used in the directional coupler.

A first circuit 841*d* of the first termination circuit 84*d* has the first end 8411 connected to the terminal 882 (see FIG. 1) of the fifth changeover switch 88*a*, and the second end 8412 connected to the ground. The first circuit 841*d* includes, for example, a variable resistor 8434, a variable capacitor 8435, and a variable inductor 8436, as illustrated in FIG. 8. The variable resistor 8434, the variable capacitor 8435, and the variable inductor 8436 are connected parallel to each other. More specifically, each of the variable resistor 8434, the variable capacitor 8435, and the variable inductor 8436 has one end (first end) connected to the first end 8411 of the first circuit 841*d*, and the other end (second end) connected to the second end 8412 of the first circuit 841*d*. The first termination circuit 84*d* includes a second circuit 842*d* having the same configuration as the first circuit 841*d*. The second circuit 842*d* has the first end 8421 connected to the terminal 884 of the sixth changeover switch 88*b* (see FIG. 1), and the second end 8422 connected to the ground. Since the variable element (variable resistor 8434, variable capacitor 8435, or variable inductor 8436) is used as the component of the first termination circuit 84*d*, it is possible to adjust the impedance of the first termination circuit 84*d*, for example, after the directional coupler 8 is manufactured. Therefore, for example, the impedance of the first termination circuit 84*d* can be optimized for a frequency band of the signal transmitted through the main line 81, and the difference in the insertion loss of the main line 81 and the phase difference of the high frequency signal between the first mode and the second mode and between the third mode can be minimized.

In these cases as well, the impedance of the sub-line 82 in the third mode for the high frequency signal transmitted through the main line 81 can be adjusted, as in the first termination circuit 84.

It should be noted that the first circuit 841 and the second circuit 842 of the first termination circuit 84 are not limited to the above-described configurations, and may be configured of any one or two of the variable resistor 8434, the variable capacitor 8435, and the variable inductor 8436. In addition, the first circuit 841 and the second circuit 842 of the first termination circuit 84 may include, for example, one or more variable elements (variable resistor 8434, variable capacitor 8435, or variable inductor 8436) and one or more invariable elements (resistor 8431, capacitor 8432, or inductor 8433). Even in this case, it is possible to adjust the impedance of the first termination circuit 84, for example, after the directional coupler 8 is manufactured.

Embodiment 2

A directional coupler 8*a* according to Embodiment 2 will be described with reference to FIG. 9. Regarding the directional coupler 8*a* according to Embodiment 2, the same components as the components of the directional coupler 8 according to Embodiment 1 are denoted by the same reference numerals, and the description thereof will be omitted.

The directional coupler 8*a* according to Embodiment 2 is different from the directional coupler 8 according to Embodiment 1 in that a first termination circuit 84*e* is provided instead of the first termination circuit 84.

(1) Configuration

Figure 9:
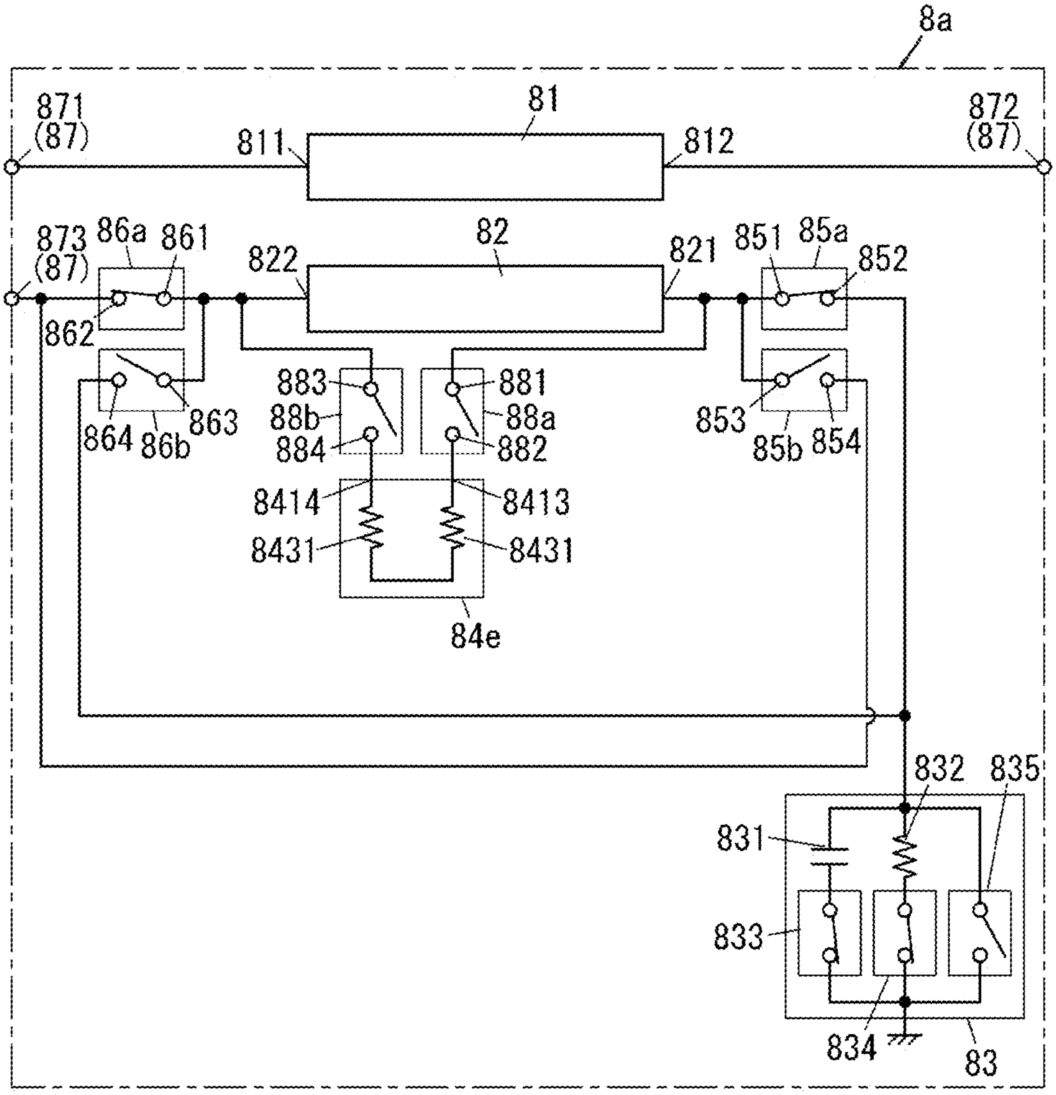
FIG. 9 is a circuit diagram illustrating a directional coupler according to Embodiment 2.

As illustrated in FIG. 9, the directional coupler 8*a* according to Embodiment 2 includes the main line 81, the sub-line 82, the plurality of connection terminals 87, the first changeover switch 85*a*, the second changeover switch 85*b*, the third changeover switch 86*a*, the fourth changeover switch 86*b*, the fifth changeover switch 88*a*, the sixth changeover switch 88*b*, and the second termination circuit 83. In addition, the directional coupler 8*a* according to Embodiment 2 includes the first termination circuit 84*e*.

The first termination circuit 84*e* is a circuit for terminating the first end 821 and the second end 822 of the sub-line 82 in the third mode. More specifically, the first termination circuit 84*e* is a pseudo termination circuit for adjusting an impedance of the sub-line 82 for the signal transmitted through the main line 81 in the third mode to the same degree as an impedance of the sub-line 82 in the first mode and the second mode. The first termination circuit 84*e* is connected between the terminal 882 of the fifth changeover switch 88*a* and the terminal 884 of the sixth changeover switch 88*b*. More specifically, the first termination circuit 84*e* has a first end 8413 connected to the terminal 882 of the fifth changeover switch 88*a*. The first termination circuit 84*e* has a second end 8414 connected to the terminal 884 of the sixth changeover switch 88*b*. The first termination circuit 84*e* includes, for example, the two resistors 8431. More specifically, the two resistors 8431 are connected in series between the first end 8413 of the first termination circuit 84*e* and the second end 8414 of the first termination circuit 84*e*. It should be noted that the first termination circuit 84*e* is not connected to the ground.

(2) Effect

In the directional coupler 8*a* according to Embodiment 2, similarly to Embodiment 1, in the third mode, the first termination circuit 84*e* terminates the sub-line 82. Accordingly, it is possible to reduce the difference in the impedance of the sub-line 82 for the high frequency signal transmitted through the main line 81 between the first mode and the detection mode, and the third mode. Therefore, the difference in the insertion loss of the main line 81 and the difference in the phase of the high frequency signal transmitted through the main line 81 between the first mode and the second mode and the third mode are reduced.

In addition, in the directional coupler 8*a* according to Embodiment 2, in the third mode, the sub-line 82 and the first termination circuit 84*e* form a closed circuit. Since the first termination circuit 84*e* is not connected to the ground, the reflection of the signal does not occur in the first termination circuit 84*e*. Therefore, it is possible to suppress the decrease in the isolation of the directional coupler 8*a*.

Embodiment 3

A directional coupler 8*b* according to Embodiment 3 will be described with reference to FIG. 10. Regarding the directional coupler 8*b* according to Embodiment 3, the same components as the components of the directional coupler 8 according to Embodiment 1 are denoted by the same reference numerals, and the description thereof will be omitted.

The directional coupler 8*b* according to Embodiment 3 is different from the directional coupler 8 according to Embodiment 1 in that a second sub-line 82*b* is further provided in addition to a first sub-line 82*a* as the sub-line. In addition, the directional coupler 8*b* according to Embodiment 3 is different from the directional coupler 8 according to Embodiment 1 in that a seventh changeover switch 85*c* and an eighth changeover switch 85*d* are further provided. In addition, the directional coupler 8*b* according to Embodiment 3 is different from the directional coupler 8 according to Embodiment 1 in that a third termination circuit 84*f* is further provided. In addition, the directional coupler 8*b* according to Embodiment 3 is different from the directional coupler 8 according to Embodiment 1 in that a ninth changeover switch 88*c* and a tenth changeover switch 88*d* are further provided.

(1) Configuration

Figure 10:
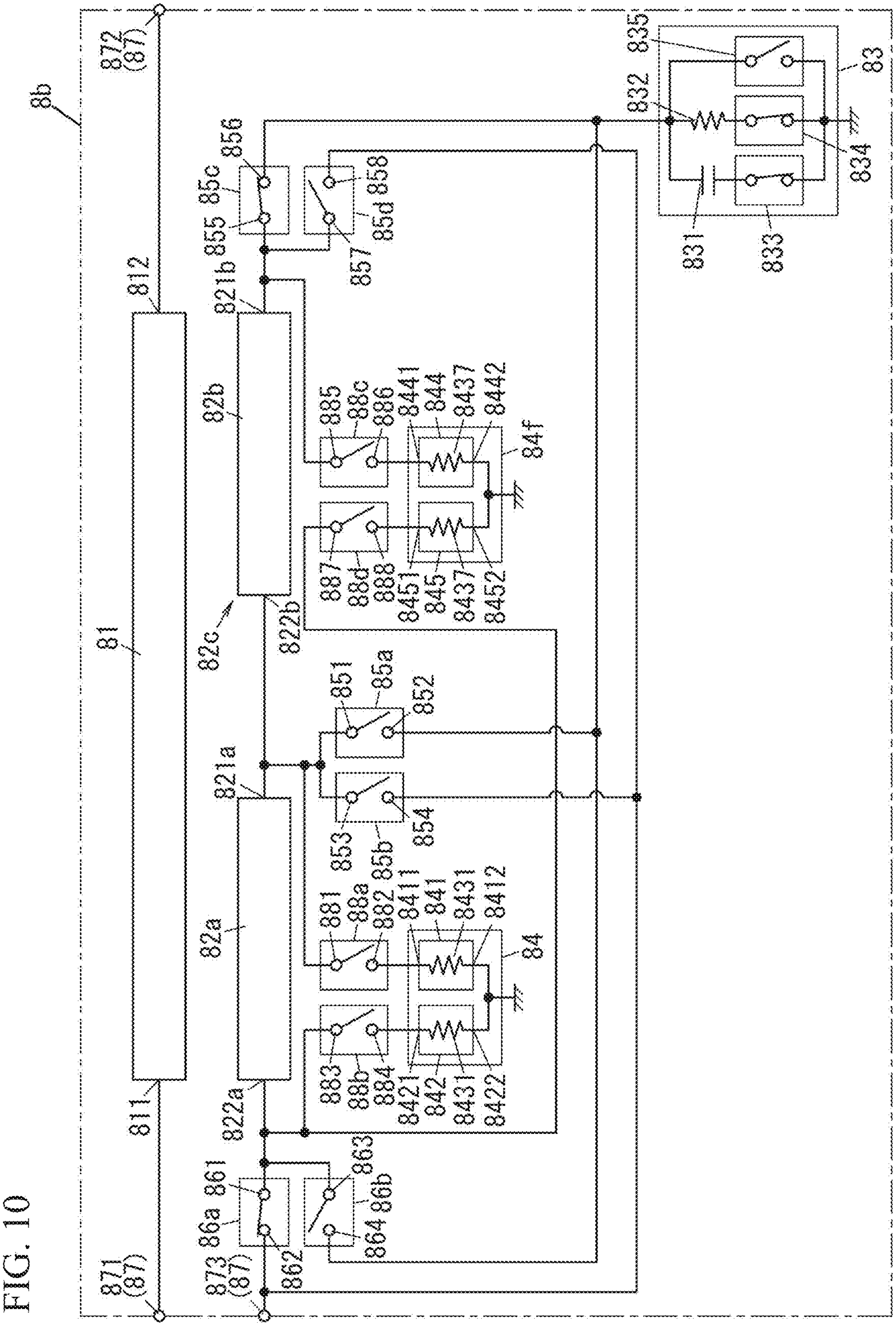
FIG. 10 is a circuit diagram illustrating a directional coupler according to Embodiment 3.

As illustrated in FIG. 10, the directional coupler 8*b* according to Embodiment 3 includes the main line 81, the first sub-line 82*a*, the second sub-line 82*b*, the plurality of connection terminals 87, the first changeover switch 85*a*, the second changeover switch 85*b*, the third changeover switch 86*a*, the fourth changeover switch 86*b*, the second termination circuit 83, the first termination circuit 84, the fifth changeover switch 88*a*, and the sixth changeover switch 88*b*. The directional coupler 8*b* according to Embodiment 3 further includes the seventh changeover switch 85*c*, the eighth changeover switch 85*d*, the third termination circuit 84*f*, the ninth changeover switch 88*c*, and the tenth changeover switch 88*d*.

The directional coupler 8*b* according to Embodiment 3 has a fourth mode and a fifth mode in addition to a first mode and a second mode as the detection modes. The first mode is a mode in which a signal in a first frequency band among the signals transmitted through the main line 81 from the first end 811 to the second end 812 is detected by the first sub-line 82*a*. The second mode is a mode in which a signal in a first frequency band among the signals transmitted from the second end 812 to the first end 811 of the main line 81 is detected by the first sub-line 82*a*. The fourth mode is a mode in which a signal in a second frequency band among the signals transmitted through the main line 81 from the first end 811 to the second end 812 is detected by the first sub-line 82*a* and the second sub-line 82*b*. The fifth mode is a mode in which a signal in a second frequency band among the signals transmitted through the main line 81 from the second end 812 to the first end 811 is detected by the first sub-line 82*a* and the second sub-line 82*b*. The second frequency band is a band with a lower frequency than the first frequency band. That is, the first mode and the second mode are high band (HB) modes in which a signal having a relatively high frequency is detected, and the fourth mode and the fifth mode are low band (LB) modes in which a signal having a relatively low frequency is detected.

The directional coupler 8*b* according to Embodiment 3 has a third mode and a sixth mode as the non-detection modes. The third mode is a mode in which the signal in the first frequency band is transmitted, received, or transmitted and received by using the main line 81 without necessarily performing the detection using the first sub-line 82*a*. The sixth mode is a mode in which the signal in the second frequency band is transmitted, received, or transmitted and received by using the main line 81 without necessarily performing the detection using the first sub-line 82*a* and the second sub-line 82*b*.

(1.1) Sub-Line

The first sub-line 82*a* has a first end 821*a* and a second end 822*a* that are both ends of the first sub-line 82*a* in a longitudinal direction. The first end 821*a* of the first sub-line 82*a* is connected to the first changeover switch 85*a* and the second changeover switch 85*b*. The first end 821*a* of the first sub-line 82*a* is connected to a second end 822*b* of the second sub-line 82*b*. The second end 822*a* of the first sub-line 82*a* is connected to the third changeover switch 86*a* and the fourth changeover switch 86*b*. The first sub-line 82*a* is, for example, electromagnetically coupled to the main line 81.

The second sub-line 82*b* has a first end 821*b* and the second end 822*b* that are both ends of the second sub-line 82*b* in a longitudinal direction. The first end 821*b* of the second sub-line 82*b* is connected to the seventh changeover switch 85*c* and the eighth changeover switch 85*d*. More specifically, the first end 821*b* of the second sub-line 82*b* is connected to a terminal 855 of the seventh changeover switch 85*c* and a terminal 857 of the eighth changeover switch 85*d*. The second end 822*b* of the second sub-line 82*b* is connected to the first end 821*a* of the first sub-line 82*a*. The second sub-line 82*b* is, for example, electromagnetically coupled to the main line 81.

Here, as illustrated in FIG. 10, the first sub-line 82*a* and the second sub-line 82*b* are disposed on the same side with respect to the main line 81 and are arranged along the longitudinal direction (left-right direction in FIG. 10) of the main line 81.

(1.2) Third Termination Circuit

In the sixth mode, the third termination circuit 84*f* is a circuit that terminates the first end 821*b* of the second sub-line 82*b* and the second end 822*a* of the first sub-line 82*a* that are both ends of the sub-line in which the first sub-line 82*a* and the second sub-line 82*b* are connected in series with each other. More specifically, the third termination circuit 84*f* is a pseudo termination circuit for controlling an impedance of the sub-line for the signal transmitted through the main line 81 in the sixth mode to the same degree as an impedance of the sub-line in the fourth mode and the fifth mode. The third termination circuit 84*f* includes a third circuit 844 connected to the first end 821*b* of the second sub-line 82*b* and a fourth circuit 845 connected to the second end 822*a* of the first sub-line 82*a*. The third circuit 844 is connected between a terminal 886 of the ninth changeover switch 88*c* and the ground. More specifically, the third circuit 844 has a first end 8441 connected to the terminal 886 of the ninth changeover switch 88*c*. The third circuit 844 has a second end 8442 connected to the ground. The third circuit 844 includes, for example, a resistor 8437. The fourth circuit 845 is connected between a terminal 888 of the tenth changeover switch 88*d* and the ground. More specifically, the fourth circuit 845 has a first end 8451 connected to the terminal 888 of the tenth changeover switch 88*d*. The fourth circuit 845 has a second end 8452 connected to the ground. The fourth circuit 845 has the same configuration as the third circuit 844, and includes, for example, the resistor 8437.

(1.3) Seventh Changeover Switch and Eighth Changeover Switch

The seventh changeover switch 85*c* and the eighth changeover switch 85*d* are switches for switching the connection destination of the first end 821*b* of the second sub-line 82*b*. The seventh changeover switch 85*c* has the two terminals 855 and 856. The terminal 855 is connected to the first end 821*b* of the second sub-line 82*b*. The terminal 856 is connected to the second termination circuit 83. The eighth changeover switch 85*d* has the two terminals 857 and 858. The terminal 857 is connected to the first end 821 of the second sub-line 82*b*. The terminal 858 is connected to the third connection terminal 873.

The seventh changeover switch 85*c* switches a first state in which the terminal 855 and the terminal 856 are connected to each other, and a second state in which the terminal 855 and the terminal 856 are connected to each other. More specifically, the seventh changeover switch 85*c* connects the terminal 855 and the terminal 856 to each other in the fourth mode, and opens the terminal 855 and the terminal 856 in the other modes, that is, the first mode, the second mode, the third mode, the fifth mode, and the sixth mode.

The eighth changeover switch 85*d* switches a first state in which the terminal 857 and the terminal 858 are connected to each other, and a second state in which the terminal 857 and the terminal 858 are connected to each other. More specifically, the eighth changeover switch 85*d* connects the terminal 857 and the terminal 858 to each other in the fifth mode, and opens the terminal 857 and the terminal 858 in the other modes, that is, the first mode, the second mode, the third mode, the fourth mode, and the sixth mode.

Accordingly, in the fourth mode, the first end 821*b* of the second sub-line 82*b* is connected to the second termination circuit 83. In the fifth mode, the first end 821*b* of the second sub-line 82*b* is connected to the third connection terminal 873. In the first mode, the second mode, the third mode, and the sixth mode, the first end 821*b* of the second sub-line 82*b* is not connected to both the second termination circuit 83 and the third connection terminal 873.

(1.4) Ninth Changeover Switch and Tenth Changeover Switch

The ninth changeover switch 88*c* and the tenth changeover switch 88*d* are switches for switching between connection and opening between the first end 821*b* of the second sub-line 82*b* and the second end 822*a* of the first sub-line 82*a*, and the third termination circuit 84*f*. The ninth changeover switch 88*c* has the two terminals 885 and 886. The terminal 885 is connected to the first end 821*b* of the second sub-line 82*b*. The terminal 886 is connected to the first end 8441 of the third circuit 844 of the third termination circuit 84*f*. The tenth changeover switch 88*d* has the two terminals 887 and 888. The terminal 887 is connected to the second end 822*a* of the first sub-line 82*a*. The terminal 888 is connected to the first end 8451 of the fourth circuit 845 of the third termination circuit 84*f*.

The ninth changeover switch 88*c* switches a first state in which the terminal 885 and the terminal 886 are connected to each other, and a second state in which the terminal 885 and the terminal 886 are opened. More specifically, the ninth changeover switch 88*c* connects the terminal 885 and the terminal 886 to each other in the sixth mode, and opens the terminal 885 and the terminal 886 in the first mode to the fifth mode.

The tenth changeover switch 88*d* switches a first state in which the terminal 887 and the terminal 888 are connected to each other, and a second state in which the terminal 887 and the terminal 888 are connected to each other. More specifically, the tenth changeover switch 88*d* connects the terminal 887 and the terminal 888 to each other in the sixth mode, and opens the terminal 887 and the terminal 888 in the first mode to the fifth mode.

Accordingly, in the sixth mode, the first end 821*b* of the second sub-line 82*b* is connected to the first end 8441 of the third termination circuit 84*f* of the third circuit 844, and the second end 822*a* of the first sub-line 82*a* is connected to the first end 8451 of the fourth circuit 845 of the third termination circuit 84*f*. In the first mode to the fifth mode, the first sub-line 82*a* and the second sub-line 82*b* are not connected to the third termination circuit 84*f*.

(2) Operation

As described above, the directional coupler 8*b* has the first mode, the second mode, the third mode, the fourth mode, the fifth mode, and the sixth mode.

(2.1) First Mode

In the first mode, the directional coupler 8*b* connects the terminal 851 and the terminal 852 of the first changeover switch 85*a* to each other, and connects the terminal 861 and the terminal 862 of the third changeover switch 86*a* to each other. In the first mode, the directional coupler 8*b* opens the terminal 853 and the terminal 854 of the second changeover switch 85*b*, and opens the terminal 863 and the terminal 864 of the fourth changeover switch 86*b*. In the first mode, the directional coupler 8*b* opens the terminal 881 and the terminal 882 of the fifth changeover switch 88*a*, and opens the terminal 883 and the terminal 884 of the sixth changeover switch 88*b*. In the first mode, the directional coupler 8*b* opens the terminal 855 and the terminal 856 of the seventh changeover switch 85*c*, and opens the terminal 857 and the terminal 858 of the eighth changeover switch 85*d*. In the first mode, the directional coupler 8*b* opens the terminal 885 and the terminal 886 of the ninth changeover switch 88*c*, and opens the terminal 887 and the terminal 888 of the tenth changeover switch 88*d*. Accordingly, in the first mode, the first end 821*a* of the first sub-line 82*a* is connected to the second termination circuit 83, and the second end 822*a* of the first sub-line 82*a* is connected to the third connection terminal 873. In the first mode, the first end 821*b* of the second sub-line 82*b* is opened.

In the first mode, the directional coupler 8*b* detects the signal in the first frequency band among the signals (transmission signals or reception signals) transmitted through the main line 81 from the first end 811 to the second end 812 by the first sub-line 82*a*, and outputs the detected signal to the external device (for example, the detector) with the third connection terminal 873 interposed therebetween.

(2.2) Second Mode

In the second mode, the directional coupler 8*b* connects the terminal 853 and the terminal 854 of the second changeover switch 85*b* to each other, and connects the terminal 863 and the terminal 864 of the fourth changeover switch 86*b* to each other. In the second mode, the terminal 851 and the terminal 852 of the first changeover switch 85*a* are opened, and the terminal 861 and the terminal 862 of the third changeover switch 86*a* are opened. In the second mode, the directional coupler 8*b* opens the terminal 881 and the terminal 882 of the fifth changeover switch 88*a*, and opens the terminal 883 and the terminal 884 of the sixth changeover switch 88*b*. In the second mode, the directional coupler 8*b* opens the terminal 855 and the terminal 856 of the seventh changeover switch 85*c*, and opens the terminal 857 and the terminal 858 of the eighth changeover switch 85*d*. In the second mode, the directional coupler 8*b* opens the terminal 885 and the terminal 886 of the ninth changeover switch 88*c*, and opens the terminal 887 and the terminal 888 of the tenth changeover switch 88*d*. Accordingly, in the second mode, the first end 821*a* of the first sub-line 82*a* is connected to the third connection terminal 873, and the second end 822*a* of the first sub-line 82*a* is connected to the second termination circuit 83. In the second mode, the first end 821*b* of the second sub-line 82*b* is opened.

In the second mode, the directional coupler 8*b* detects the signal in the first frequency band among the signals (transmission signals or reception signals) transmitted through the main line 81 from the second end 812 to the first end 811 by the first sub-line 82*a*, and outputs the detected signal to the external device (for example, the detector) with the third connection terminal 873 interposed therebetween.

(2.3) Third Mode

In the third mode, the directional coupler 8*b* connects the terminal 881 and the terminal 882 of the fifth changeover switch 88*a* to each other, and connects the terminal 883 and the terminal 884 of the sixth changeover switch 88*b* to each other. In the third mode, the directional coupler 8*b* opens the terminal 851 and the terminal 852 of the first changeover switch 85*a*, and opens the terminal 861 and the terminal 862 of the third changeover switch 86*a*. In the third mode, the directional coupler 8*b* opens the terminal 853 and the terminal 854 of the second changeover switch 85*b*, and opens the terminal 863 and the terminal 864 of the fourth changeover switch 86*b*. In the third mode, the directional coupler 8*b* opens the terminal 855 and the terminal 856 of the seventh changeover switch 85*c*, and opens the terminal 857 and the terminal 858 of the eighth changeover switch 85*d*. In the third mode, the directional coupler 8*b* opens the terminal 885 and the terminal 886 of the ninth changeover switch 88*c*, and opens the terminal 887 and the terminal 888 of the tenth changeover switch 88*d*. Accordingly, in the third mode, the first end 821*a* of the first sub-line 82*a* is connected to the first end 8411 of the first circuit 841 of the first termination circuit 84, and the second end 822*a* of the first sub-line 82*a* is connected to the first end 8421 of the second circuit 842 of the first termination circuit 84. In the third mode, the first end 821*b* of the second sub-line 82*b* is opened.

In the directional coupler 8*b*, in the third mode, the first termination circuit 84 terminates the first sub-line 82*a*. Accordingly, the first sub-line 82*a* has an impedance corresponding to the first termination circuit 84 for the signal in the first frequency band transmitted through the main line 81. Therefore, it is possible to make the insertion losses of the main line 81 of the directional coupler 8*b* and the phases of the signal transmitted through the main line 81 for the signal in the first frequency band close to each other between the first mode and the second mode, and the third mode. As a result, it is possible to suppress, for the signal in the first frequency band, the fluctuations in the insertion loss of the main line 81 and the phase of the signal transmitted through the main line 81, the fluctuations depending on the mode of the directional coupler 8*b*.

(2.4) Fourth Mode

In the fourth mode, the directional coupler 8*b* connects the terminal 861 and the terminal 862 of the third changeover switch 86*a* to each other, and connects the terminal 855 and the terminal 856 of the seventh changeover switch 85*c* to each other. In the fourth mode, the directional coupler 8*b* opens the terminal 863 and the terminal 864 of the fourth changeover switch 86*b*, and opens the terminal 857 and the terminal 858 of the eighth changeover switch 85*d*. In the fourth mode, the directional coupler 8*b* opens the terminal 851 and the terminal 852 of the first changeover switch 85*a*, and opens the terminal 853 and the terminal 854 of the second changeover switch 85*b*. In the fourth mode, the directional coupler 8*b* opens the terminal 881 and the terminal 882 of the fifth changeover switch 88*a*, and opens the terminal 883 and the terminal 884 of the sixth changeover switch 88*b*. In the fourth mode, the directional coupler 8*b* opens the terminal 885 and the terminal 886 of the ninth changeover switch 88*c*, and opens the terminal 887 and the terminal 888 of the tenth changeover switch 88*d*. Accordingly, in the fourth mode, the first end 821*b* of the second sub-line 82*b* is connected to the second termination circuit 83, and the second end 822*a* of the first sub-line 82*a* is connected to the third connection terminal 873.

In the fourth mode, the first end 821*a* of the first sub-line 82*a* and the second end 822*b* of the second sub-line 82*b* are connected to each other. Therefore, a series circuit (hereinafter, referred to as a "sub-line 82*c*") of the first sub-line 82*a* and the second sub-line 82*b* functions as the sub-line.

In the fourth mode, the directional coupler 8*b* detects the signal in the second frequency band among the signals (transmission signals or reception signals) transmitted through the main line 81 from the first end 811 to the second end 812 by the sub-line 82*c*, and outputs the detected signal to the external device (for example, the detector) with the third connection terminal 873 interposed therebetween.

(2.5) Fifth Mode

In the fifth mode, the directional coupler 8*b* connects the terminal 863 and the terminal 864 of the fourth changeover switch 86*b* to each other, and connects the terminal 857 and the terminal 858 of the eighth changeover switch 85*d* to each other. In the fifth mode, the directional coupler 8*b* opens the terminal 861 and the terminal 862 of the third changeover switch 86*a*, and opens the terminal 855 and the terminal 856 of the seventh changeover switch 85*c*. In the fifth mode, the directional coupler 8*b* opens the terminal 851 and the terminal 852 of the first changeover switch 85*a*, and opens the terminal 853 and the terminal 854 of the second changeover switch 85*b*. In the fifth mode, the directional coupler 8*b* opens the terminal 881 and the terminal 882 of the fifth changeover switch 88*a*, and opens the terminal 883 and the terminal 884 of the sixth changeover switch 88*b*. In the fifth mode, the directional coupler 8*b* opens the terminal 885 and the terminal 886 of the ninth changeover switch 88*c*, and opens the terminal 887 and the terminal 888 of the tenth changeover switch 88*d*. Accordingly, in the fifth mode, the first end 821*b* of the second sub-line 82*b* is connected to the third connection terminal 873, and the second end 822*a* of the first sub-line 82*a* is connected to the second termination circuit 83.

In the fifth mode, the first end 821*a* of the first sub-line 82*a* and the second end 822*b* of the second sub-line 82*b* are connected to each other. Therefore, the sub-line 82*c* functions as the sub-line.

In the fifth mode, the directional coupler 8*b* detects the signal in the second frequency band among the signals (transmission signals or reception signals) transmitted through the main line 81 from the second end 812 to the first end 811 by the sub-line 82*c*, and outputs the detected signal to the external device (for example, the detector) with the third connection terminal 873 interposed therebetween.

(2.6) Sixth Mode

In the sixth mode, the directional coupler 8*b* connects the terminal 885 and the terminal 886 of the ninth changeover switch 88*c* to each other, and connects the terminal 887 and the terminal 888 of the tenth changeover switch 88*d* to each other. In the sixth mode, the directional coupler 8*b* opens the terminal 861 and the terminal 862 of the third changeover switch 86*a*, and opens the terminal 855 and the terminal 856 of the seventh changeover switch 85*c*. In the sixth mode, the directional coupler 8*b* opens the terminal 863 and the terminal 864 of the fourth changeover switch 86*b*, and opens the terminal 857 and the terminal 858 of the eighth changeover switch 85*d*. In the sixth mode, the directional coupler 8*b* opens the terminal 851 and the terminal 852 of the first changeover switch 85*a*, and opens the terminal 853 and the terminal 854 of the second changeover switch 85*b*. In the sixth mode, the directional coupler 8*b* opens the terminal 881 and the terminal 882 of the fifth changeover switch 88*a*, and opens the terminal 883 and the terminal 884 of the sixth changeover switch 88*b*. Accordingly, in the sixth mode, the first end 821*b* of the second sub-line 82*b* is connected to the first end 8441 of the third termination circuit 84*f* of the third circuit 844, and the second end 822*a* of the first sub-line 82*a* is connected to the first end 8451 of the fourth circuit 845 of the third termination circuit 84*f*.

In the sixth mode, the first end 821*a* of the first sub-line 82*a* and the second end 822*b* of the second sub-line 82*b* are connected to each other. That is, a first end of the sub-line 82*c* is the first end 821*b* of the second sub-line 82*b*, and a second end of the sub-line 82*c* is the second end 822*a* of the first sub-line 82*a*. Therefore, in the sixth mode, the first end 821*b* of the sub-line 82*c* is connected to the first end 8441 of the third circuit 844 of the third termination circuit 84*f*, and the second end 822*a* of the sub-line 82*c* is connected to the first end 8451 of the fourth circuit 845 of the third termination circuit 84*f*.

In the sixth mode, the directional coupler 8*b* terminates the sub-line 82*c* by the third termination circuit 84*f*. Accordingly, the sub-line 82*c* has an impedance corresponding to the third termination circuit 84*f* for the signal in the second frequency band transmitted through the main line 81. Therefore, it is possible to make the insertion losses of the main line 81 of the directional coupler 8*b* and the phases of the signal transmitted through the main line 81 for the signal in the second frequency band close to each other between the fourth mode and the fifth mode, and the sixth mode. As a result, it is possible to suppress, for the signal in the second frequency band, the fluctuations in the insertion loss of the main line 81 and the phase of the signal transmitted through the main line 81, the fluctuations depending on the mode of the directional coupler 8*b*.

(3) Effect

In the directional coupler 8*b* according to Embodiment 3, as described above, in the third mode, the first termination circuit 84 terminates the first sub-line 82*a*. Accordingly, it is possible to reduce the difference in the impedance of the first sub-line 82*a* for the signal in the first frequency band transmitted through the main line 81 between the first mode and the second mode, and the third mode. Therefore, it is possible to suppress, for the signal in the first frequency band, the fluctuations in the insertion loss of the main line 81 and the phase of the signal transmitted through the main line 81, the fluctuations depending on the mode of the directional coupler 8*b*.

In addition, in the directional coupler 8*b* according to Embodiment 3, as described above, in the sixth mode, the third termination circuit 84*f* terminates the sub-line 82*c* which is a series circuit of the first sub-line 82*a* and the second sub-line 82*b*. Accordingly, it is possible to reduce the difference in the impedance of the sub-line 82*c* for the signal in the second frequency band transmitted through the main line 81 between the fourth mode and the fifth mode, and the sixth mode. Therefore, it is possible to suppress, for the signal in the second frequency band, the fluctuations in the insertion loss of the main line 81 and the phase of the signal transmitted through the main line 81, the fluctuations depending on the mode of the directional coupler 8*b*.

Embodiment 4

A directional coupler 8*c* according to Embodiment 4 will be described with reference to FIGS. 11 and 12. Regarding the directional coupler 8*c* according to Embodiment 4, the same components as the components of the directional coupler 8*b* according to Embodiment 3 are denoted by the same reference numerals, and the description thereof will be omitted.

(1) Configuration

The directional coupler 8*c* according to Embodiment 4 is different from the directional coupler 8*b* according to Embodiment 3 in that a phase-shift circuit 89 is further provided between the second end 822*a* of the first sub-line 82*a* and the first end 821*b* of the second sub-line 82*b*.

Figure 11:
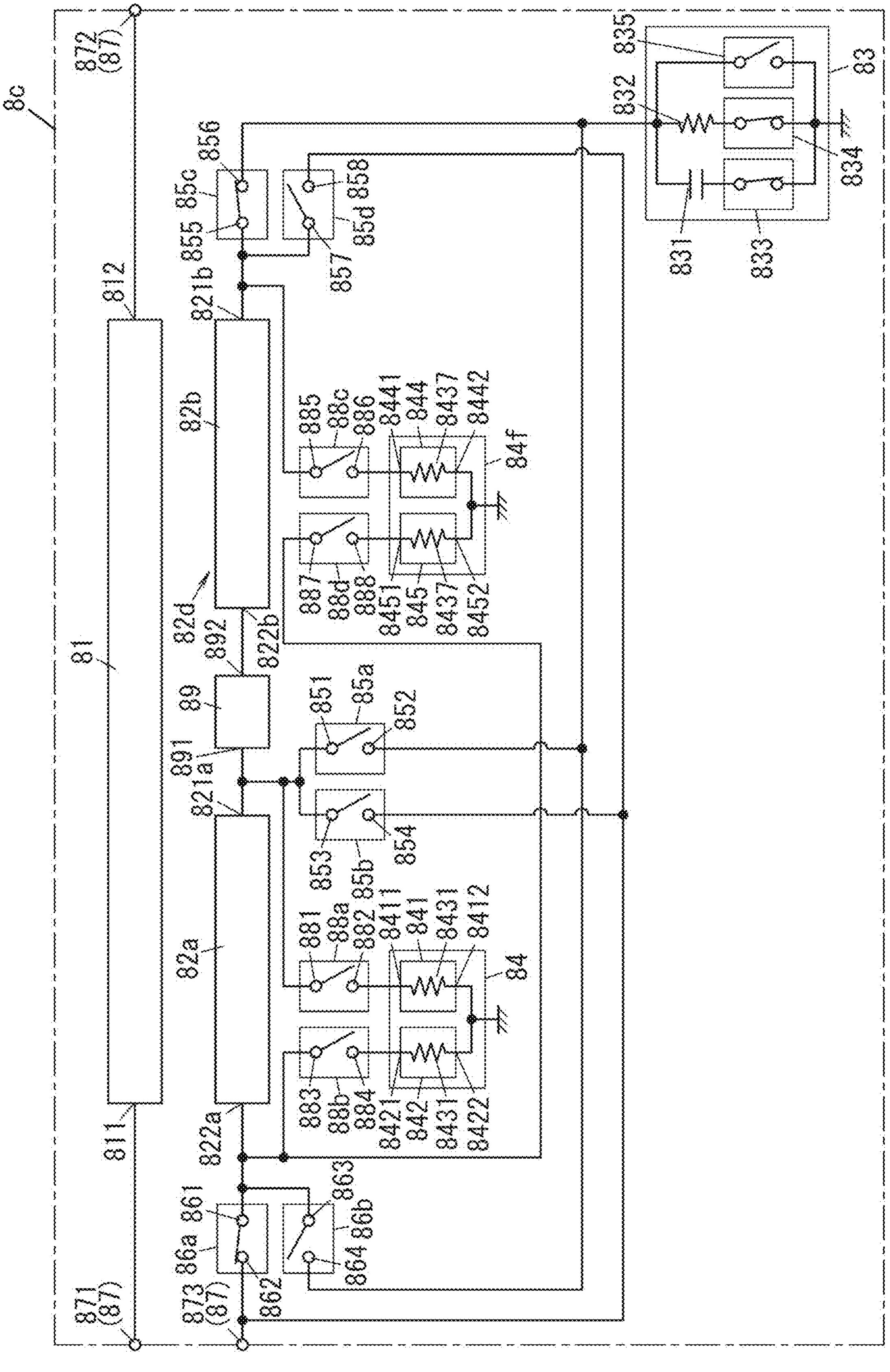
FIG. 11 is a circuit diagram illustrating a directional coupler according to Embodiment 4.
Figure 12:
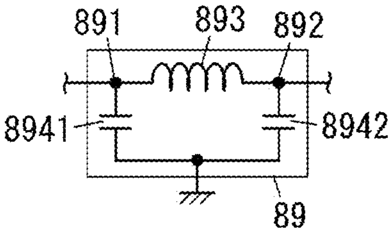
FIG. 12 is a circuit diagram illustrating a phase-shift circuit used in the directional coupler.

As illustrated in FIG. 11, the directional coupler 8*c* according to Embodiment 4 includes the main line 81, the first sub-line 82*a*, the second sub-line 82*b*, the plurality of connection terminals 87, the first changeover switch 85*a*, the second changeover switch 85*b*, the third changeover switch 86*a*, the fourth changeover switch 86*b*, the second termination circuit 83, the first termination circuit 84, the fifth changeover switch 88*a*, and the sixth changeover switch 88*b*. The directional coupler 8*c* according to Embodiment 4 further includes the seventh changeover switch 85*c*, the eighth changeover switch 85*d*, the third termination circuit 84*f*, the ninth changeover switch 88*c*, the tenth changeover switch 88*d*, and the phase-shift circuit 89.

(1.1) Phase-Shift Circuit

The phase-shift circuit 89 is provided between the first end 821*a* of the first sub-line 82*a* and the second end 822*b* of the second sub-line 82*b*. More specifically, the phase-shift circuit 89 has a first end 891 connected to the first end 821*a* of the first sub-line 82*a*. The phase-shift circuit 89 has a second end 892 connected to the second end 822*b* of the second sub-line 82*b*. As illustrated in FIG. 12, the phase-shift circuit 89 includes, for example, an inductor 893, and two capacitors 8941 and 8942. The inductor 893 is connected to the first end 891 and the second end 892 that are both ends of the phase-shift circuit 89. The capacitor 8941 is provided between the first end 891 of the phase-shift circuit 89 and the ground. The capacitor 8942 is provided between the second end 892 of the phase-shift circuit 89 and the ground.

(2) Operation

The directional coupler 8*c* has a first mode, a second mode, a third mode, a fourth mode, a fifth mode, and a sixth mode. Since the first mode, the second mode, and the third mode are the same as the first mode, the second mode, and the third mode in Embodiment 3, the fourth mode, the fifth mode, and the sixth mode will be described below.

(2.1) Fourth Mode

In the fourth mode, the directional coupler 8*c* connects the terminal 861 and the terminal 862 of the third changeover switch 86*a* to each other, and connects the terminal 855 and the terminal 856 of the seventh changeover switch 85*c* to each other. In the fourth mode, the directional coupler 8*c* opens the terminal 863 and the terminal 864 of the fourth changeover switch 86*b*, and opens the terminal 857 and the terminal 858 of the eighth changeover switch 85*d*. In the fourth mode, the directional coupler 8*c* opens the terminal 851 and the terminal 852 of the first changeover switch 85*a*, and opens the terminal 853 and the terminal 854 of the second changeover switch 85*b*. In the fourth mode, the directional coupler 8*c* opens the terminal 881 and the terminal 882 of the fifth changeover switch 88*a*, and opens the terminal 883 and the terminal 884 of the sixth changeover switch 88*b*. In the fourth mode, the directional coupler 8*c* opens the terminal 885 and the terminal 886 of the ninth changeover switch 88*c*, and opens the terminal 887 and the terminal 888 of the tenth changeover switch 88*d*. Accordingly, in the fourth mode, the first end 821*b* of the second sub-line 82*b* is connected to the second termination circuit 83, and the second end 822*a* of the first sub-line 82*a* is connected to the third connection terminal 873.

In the fourth mode, the first end 821*a* of the first sub-line 82*a* and the second end 822*b* of the second sub-line 82*b* are connected to each other with the phase-shift circuit 89 interposed therebetween. Therefore, a series circuit (hereinafter, referred to as a "sub-line 82*d*") of the first sub-line 82*a* and the second sub-line 82*b* functions as the sub-line.

In the fourth mode, the directional coupler 8*c* detects the signal in the second frequency band among the signals (reception signals or transmission signals) transmitted through the main line 81 from the first end 811 to the second end 812 by the sub-line 82*d*, and outputs the detected signal to the external device (for example, the detector) with the third connection terminal 873 interposed therebetween. Here, in Embodiment 4, the phase-shift circuit 89 is provided in a signal path between the first sub-line 82*a* and the second sub-line 82*b* in the sub-line 82*d*. That is, it is possible to adjust the phases of the first sub-line 82*a* and the second sub-line 82*b*. Therefore, it is possible to reduce the insertion loss of the directional coupler 8*c* in a case in which the signal in the first frequency band is transmitted, received, or transmitted and received in the fourth mode.

(2.2) Fifth Mode

In the fifth mode, the directional coupler 8*c* connects the terminal 863 and the terminal 864 of the fourth changeover switch 86*b* to each other, and connects the terminal 857 and the terminal 858 of the eighth changeover switch 85*d* to each other. In the fifth mode, the directional coupler 8*c* opens the terminal 861 and the terminal 862 of the third changeover switch 86*a*, and opens the terminal 855 and the terminal 856 of the seventh changeover switch 85*c*. In the fifth mode, the directional coupler 8*c* opens the terminal 851 and the terminal 852 of the first changeover switch 85*a*, and opens the terminal 853 and the terminal 854 of the second changeover switch 85*b*. In the fifth mode, the directional coupler 8*c* opens the terminal 881 and the terminal 882 of the fifth changeover switch 88*a*, and opens the terminal 883 and the terminal 884 of the sixth changeover switch 88*b*. In the fifth mode, the directional coupler 8*c* opens the terminal 885 and the terminal 886 of the ninth changeover switch 88*c*, and opens the terminal 887 and the terminal 888 of the tenth changeover switch 88*d*. Accordingly, in the fifth mode, the first end 821*b* of the second sub-line 82*b* is connected to the third connection terminal 873, and the second end 822*a* of the first sub-line 82*a* is connected to the second termination circuit 83.

In the fifth mode, the first end 821*a* of the first sub-line 82*a* and the second end 822*b* of the second sub-line 82*b* are connected to each other with the phase-shift circuit 89 interposed therebetween. Therefore, the sub-line 82*d* functions as the sub-line.

In the fifth mode, the directional coupler 8*c* detects the signal in the second frequency band among the signals (reception signals or transmission signals) transmitted through the main line 81 from the second end 812 to the first end 811 by the sub-line 82*d*, and outputs the detected signal to the external device (for example, the detector) with the third connection terminal 873 interposed therebetween. Here, in Embodiment 4, the phase-shift circuit 89 is provided in the signal path between the first sub-line 82*a* and the second sub-line 82*b* in the sub-line 82*d*, and the phases of the first sub-line 82*a* and the second sub-line 82*b* can be adjusted. Therefore, it is possible to reduce the insertion loss of the directional coupler 8*c* in a case in which the signal in the first frequency band is transmitted, received, or transmitted and received in the fifth mode.

(2.3) Sixth Mode

In the sixth mode, the directional coupler 8*c* connects the terminal 885 and the terminal 886 of the ninth changeover switch 88*c* to each other, and connects the terminal 887 and the terminal 888 of the tenth changeover switch 88*d* to each other. In the sixth mode, the directional coupler 8*c* opens the terminal 861 and the terminal 862 of the third changeover switch 86*a*, and opens the terminal 855 and the terminal 856 of the seventh changeover switch 85*c*. In the sixth mode, the directional coupler 8*c* opens the terminal 863 and the terminal 864 of the fourth changeover switch 86*b*, and opens the terminal 857 and the terminal 858 of the eighth changeover switch 85*d*. In the sixth mode, the directional coupler 8*c* opens the terminal 851 and the terminal 852 of the first changeover switch 85*a*, and opens the terminal 853 and the terminal 854 of the second changeover switch 85*b*. In the sixth mode, the directional coupler 8*c* opens the terminal 881 and the terminal 882 of the fifth changeover switch 88*a*, and opens the terminal 883 and the terminal 884 of the sixth changeover switch 88*b*. Accordingly, in the sixth mode, the first end 821*b* of the second sub-line 82*b* is connected to the first end 8441 of the third termination circuit 84*f* of the third circuit 844, and the second end 822*a* of the first sub-line 82*a* is connected to the first end 8451 of the fourth circuit 845 of the third termination circuit 84*f*.

In the sixth mode, the first end 821*a* of the first sub-line 82*a* and the second end 822*b* of the second sub-line 82*b* are connected to each other with the phase-shift circuit 89 interposed therebetween. That is, a first end of the sub-line 82*d* is the first end 821*b* of the second sub-line 82*b*, and a second end of the sub-line 82*d* is the second end 822*a* of the first sub-line 82*a*. Therefore, in the sixth mode, the first end 821*b* of the sub-line 82*d* is connected to the first end 8441 of the third circuit 844 of the third termination circuit 84*f*, and the second end 822*a* of the sub-line 82*d* is connected to the first end 8451 of the fourth circuit 845 of the third termination circuit 84*f*.

In the sixth mode, the directional coupler 8*c* terminates the sub-line 82*d* by the third termination circuit 84*f*. Accordingly, the sub-line 82*d* has an impedance corresponding to the third termination circuit **84*f* for the signal in the second frequency band transmitted through the main line 81. Therefore, it is possible to make the insertion losses of the main line 81 of the directional coupler 8*c* and the phases of the signal transmitted through the main line 81 for the signal in the second frequency band close to each other between the fourth mode and the fifth mode, and the sixth mode. As a result, it is possible to suppress, for the signal in the second frequency band, the fluctuations in the insertion loss of the main line 81 and the phase of the signal transmitted through the main line 81, the fluctuations depending on the mode of the directional coupler 8*c*. Here, in Embodiment 4, the phase-shift circuit 89 is provided in the signal path between the first sub-line 82*a* and the second sub-line 82*b* in the sub-line 82*d*, and the phases of the first sub-line 82*a* and the second sub-line 82*b* can be adjusted. Therefore, it is possible to reduce the insertion loss of the directional coupler 8*c*** in a case in which the signal in the first frequency band is transmitted, received, or transmitted and received in the sixth mode.

(3) Effect

In the directional coupler **8*c* according to Embodiment 4, as described above, in the third mode, the first termination circuit 84 terminates the first sub-line 82*a*. Accordingly, it is possible to reduce the difference in the impedance of the first sub-line 82*a* for the signal in the first frequency band transmitted through the main line 81 between the first mode and the second mode, and the third mode. Therefore, it is possible to suppress, for the signal in the first frequency band, the fluctuations in the insertion loss of the main line 81 and the phase of the signal transmitted through the main line 81, the fluctuations depending on the mode of the directional coupler 8*c***.

In addition, in the directional coupler **8*c* according to Embodiment 4, as described above, in the sixth mode, the third termination circuit 84*f* terminates the sub-line 82*d*. Accordingly, it is possible to reduce the difference in the impedance of the sub-line 82*d* for the signal in the second frequency band transmitted through the main line 81 between the fourth mode and the fifth mode, and the sixth mode. Therefore, it is possible to suppress, for the signal in the second frequency band, the fluctuations in the insertion loss of the main line 81 and the phase of the signal transmitted through the main line 81, the fluctuations depending on the mode of the directional coupler 8*c***.

In the directional coupler **8*c* according to Embodiment 4, the phase-shift circuit 89 is provided in the signal path between the first sub-line 82*a* and the second sub-line 82*b* in the sub-line 82*d*, and the phases of the first sub-line 82*a* and the second sub-line 82*b* can be adjusted. Therefore, it is possible to reduce the insertion loss of the directional coupler 8*c*** in a case in which the signal in the first frequency band is transmitted, received, or transmitted and received in the fourth to sixth modes.

(4) Modification Example

The directional coupler **8*c* may include a phase-shift circuit 89*a* or a phase-shift circuit 89*b* instead of the phase-shift circuit 89**.

Figure 13:
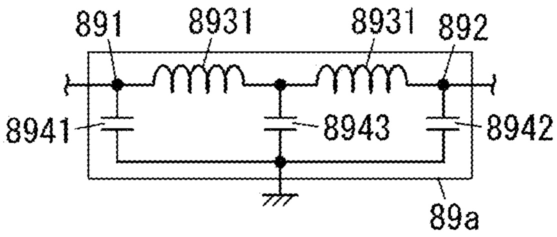
FIG. 13 is a circuit diagram illustrating a modification example of the phase-shift circuit used in the directional coupler.

As illustrated in FIG. 13, the phase-shift circuit **89*a* includes, for example, a plurality (two in the illustrated example) of inductors 8931 and a plurality (three in the illustrated example) of capacitors 8941 to 8943. The plurality of inductors 8931 are connected in series with each other, and are connected between both ends (first end 891 and second end 892) of the phase-shift circuit 89*a*. The capacitor 8941 is connected between the first end 891 of the phase-shift circuit 89*a* and the ground. The capacitor 8942 is connected between the second end 892 of the phase-shift circuit 89*a* and the ground. The capacitor 8943 is connected between the mutual connection point of the two inductors 8931** and the ground.

Figure 14:
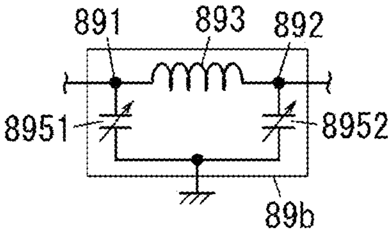
FIG. 14 is a circuit diagram illustrating another modification example of the phase-shift circuit used in the directional coupler.

In addition, as illustrated in FIG. 14, the phase-shift circuit **89*b* includes, for example, the inductor 893 and two variable capacitors 8951 and 8952. The inductor 893 is connected between both ends (first end 891 and second end 892) of the phase-shift circuit 89*b*. The variable capacitor 8951 is connected between the first end 891 of the phase-shift circuit 89*b* and the ground. The variable capacitor 8952 is connected between the second end 892 of the phase-shift circuit 89*b*** and the ground.

In these cases as well, the phases of the first sub-line **82*a* and the second sub-line 82*b* can be adjusted as in the phase-shift circuit 89, and as a result, the insertion loss of the directional coupler 8*c*** for the first frequency band can be reduced in the LB mode.

Embodiment 5

(1) High Frequency Module and Communication Device (1.1) Configuration of High Frequency Module A configuration of a high frequency module 100 according to Embodiment 5 will be described with reference to FIG. 15.

Figure 15:
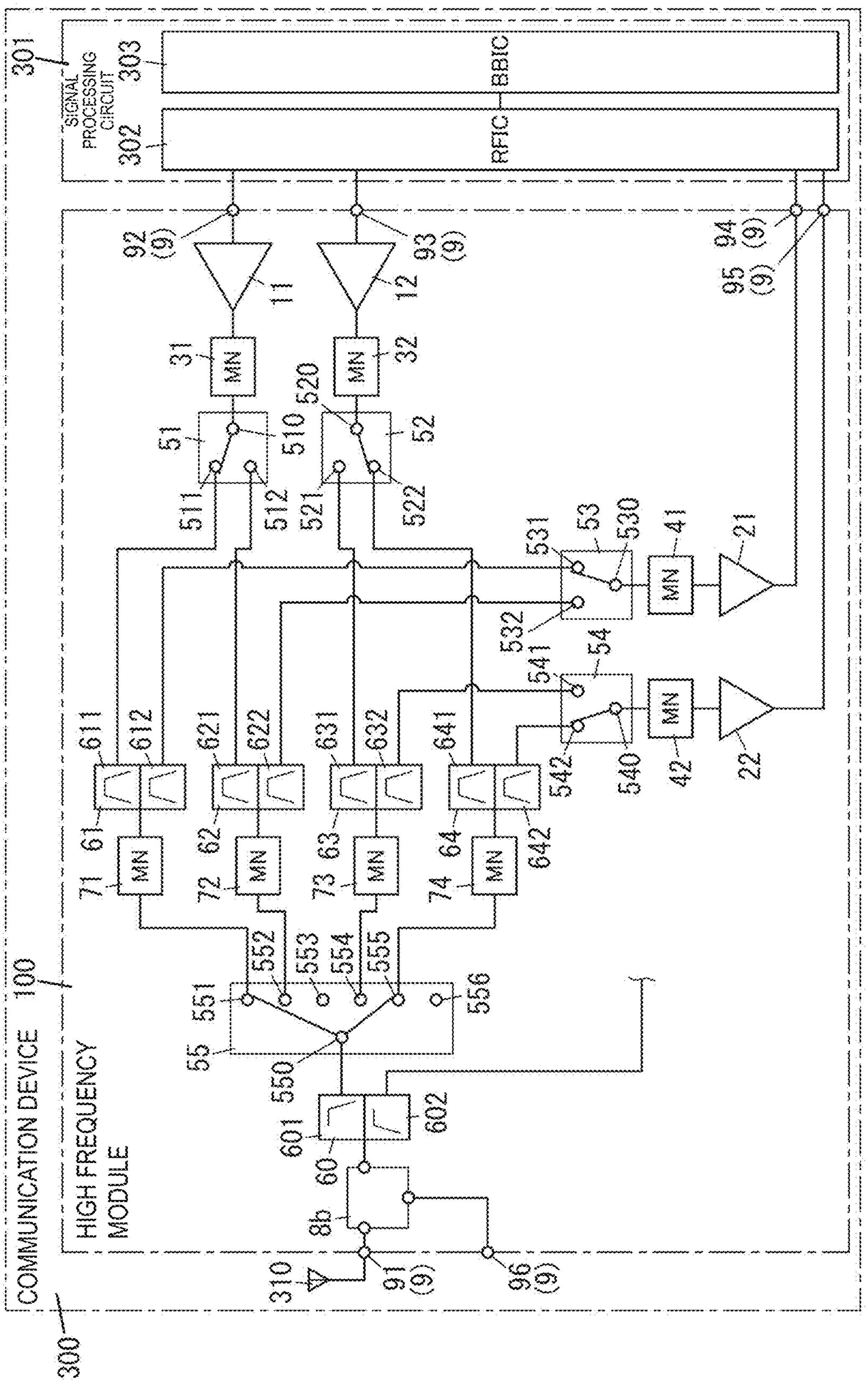
FIG. 15 is a circuit diagram of a high frequency module and a communication device according to Embodiment 5.

The high frequency module 100 is used, for example, in a communication device 300 as illustrated in FIG. 15. The communication device 300 is, for example, a cellular phone such as a smartphone. It should be noted that the communication device 300 is not limited to a cellular phone, and may be, for example, a wearable terminal such as a smart watch. The high frequency module 100 is, for example, a module that is compatible with a fourth generation mobile communication (4G) standard or a fifth generation mobile communication (5G) standard. The 4G standard is, for example, a third generation partnership project (3GPP) (registered trademark) long term evolution (LTE) standard (registered trademark). The 5G standard is, for example, 5G new radio (NR). The high frequency module 100 is, for example, a module that is compatible with carrier aggregation and dual connectivity.

The communication device 300 performs communication in a plurality of communication bands. More specifically, the communication device 300 performs the transmission in the plurality of communication bands and the reception of the reception signals in the plurality of communication bands.

Some of the transmission signals and the reception signals in the plurality of communication bands are signals of a frequency division duplex (FDD). It should be noted that the transmission signal and the reception signal in the plurality of communication bands are not limited to the signals of the FDD, and may be signals of time division duplex (TDD). The FDD is a wireless communication technology in which the transmission and the reception are performed by assigning different frequency bands to the transmission and the reception in wireless communication. The TDD is a wireless communication technology in which the transmission and the reception are performed in a switched manner by assigning the same frequency band to the transmission and the reception in wireless communication.

As illustrated in FIG. 15, the high frequency module 100 includes a first power amplifier 11, a second power amplifier 12, a first switch 51, a second switch 52, and a plurality (five in the illustrated example) of filters 60 to 64. The high frequency module 100 further includes a first output matching circuit 31, a second output matching circuit 32, and a plurality (four in the illustrated example) of matching circuits 71 to 74. The high frequency module 100 further includes a first low noise amplifier 21, a second low noise amplifier 22, a first input matching circuit 41, and a second input matching circuit 42. The high frequency module 100 further includes a third switch 53, a fourth switch 54, and a fifth switch 55. The high frequency module 100 further includes the directional coupler 8*b*. The high frequency module 100 further includes a plurality of external connection terminals 9. It should be noted that the directional coupler 8*b* is the same as the directional coupler 8*b* described in Embodiment 3.

(1.1.1) Power Amplifier

The first power amplifier 11 is, for example, an amplifier that amplifies the transmission signals in a first communication band and a second communication band included in the first frequency band. The first power amplifier 11 is provided in a signal path between a plurality of transmission filters 611 and 621, and a signal input terminal 92, which will be described below. The first power amplifier 11 includes a first input terminal (not illustrated) and a first output terminal (not illustrated). The first input terminal of the first power amplifier 11 is connected to an external circuit (for example, a signal processing circuit 301) with the signal input terminal 92 interposed therebetween. The first output terminal of the first power amplifier 11 is connected to the transmission filters 611 and 621. The first power amplifier 11 is controlled by, for example, a controller (not illustrated). It should be noted that the first power amplifier 11 need only be connected to the transmission filters 611 and 621 directly or indirectly. In the example illustrated in FIG. 15, the first power amplifier 11 is connected to the transmission filters 611 and 621 with the first output matching circuit 31 interposed therebetween.

The second power amplifier 12 is, for example, an amplifier that amplifies the transmission signals in a third communication band and a fourth communication band included in the second frequency band. The second power amplifier 12 is provided in a signal path between a plurality of transmission filters 631 and 641, and a signal input terminal 93, which will be described below. The second power amplifier 12 includes a second input terminal (not illustrated) and a second output terminal (not illustrated). The second input terminal of the second power amplifier 12 is connected to the external circuit (for example, the signal processing circuit 301) with the signal input terminal 93 interposed therebetween. The second output terminal of the second power amplifier 12 is connected to the transmission filters 631 and 641. The second power amplifier 12 is controlled by, for example, the controller. It should be noted that the second power amplifier 12 need only be connected to the transmission filters 631 and 641 directly or indirectly. In the example illustrated in FIG. 15, the second power amplifier 12 is connected to the transmission filters 631 and 641 with the second output matching circuit 32 interposed therebetween.

(1.1.2) Filter

The filter 61 is a duplexer including the transmission filter 611 and the reception filter 612. The transmission filter 611 is, for example, a band pass filter in which a transmission band of the first communication band is used as a pass band. The reception filter 612 is, for example, a band pass filter in which a reception band of the first communication band is used as a pass band.

The filter 62 is a duplexer including the transmission filter 621 and the reception filter 622. The transmission filter 621 is, for example, a band pass filter in which a transmission band of the second communication band is used as a pass band. The reception filter 622 is, for example, a band pass filter in which a reception band of the second communication band is used as a pass band.

The filter 63 is a duplexer including the transmission filter 631 and the reception filter 632. The transmission filter 631 is, for example, a band pass filter in which a transmission band of the third communication band is used as a pass band. The reception filter 632 is, for example, a band pass filter in which a reception band of the third communication band is used as a pass band.

The filter 64 is a duplexer including the transmission filter 641 and the reception filter 642. The transmission filter 641 is, for example, a band pass filter in which a transmission band of the fourth communication band is used as a pass band. The reception filter 642 is, for example, a band pass filter in which a reception band of the fourth communication band is used as a pass band.

The filter 60 is a diplexer having a plurality (two in the illustrated example) of filters 601 and 602. Each of the plurality of filters 601 and 602 is, for example, an LC filter. The filter 601 is, for example, a low pass filter in which the first communication band, the second communication band, the third communication band, and the fourth communication band are used as pass bands. The filter 602 is, for example, a high pass filter in which the fifth communication band is used as a pass band. That is, the fifth communication band is a communication band having a higher frequency than the first communication band, the second communication band, the third communication band, and the fourth communication band.

(1.1.3) Output Matching Circuit

The first output matching circuit 31 is provided in a signal path between the first output terminal of the first power amplifier 11 and a common terminal 510 of the first switch 51, which will be described below. The first output matching circuit 31 is a circuit for performing impedance matching between the first power amplifier 11 and the two transmission filters 611 and 621. The first output matching circuit 31 has, for example, a configuration including one inductor. The inductor of the first output matching circuit 31 is provided on an output side of the first power amplifier 11. It should be noted that the first output matching circuit 31 is not limited to the configuration including one inductor, and may have, for example, a configuration including a plurality of inductors, or a configuration including a plurality of inductors and a plurality of capacitors.

The second output matching circuit 32 is provided in a signal path between the second output terminal of the second power amplifier 12 and a common terminal 520 of the second switch 52, which will be described below. The second output matching circuit 32 is a circuit for performing impedance matching between the second power amplifier 12 and the two transmission filters 631 and 641. The second output matching circuit 32 has, for example, a configuration including one inductor. The inductor of the second output matching circuit 32 is provided on an output side of the second power amplifier 12. It should be noted that the second output matching circuit 32 is not limited to the configuration including one inductor, and may have, for example, a configuration including a plurality of inductors, or a configuration including a plurality of inductors and a plurality of capacitors.

(1.1.4) Matching Circuit

The plurality (four in the illustrated example) of matching circuits 71 to 74 correspond one-to-one to a plurality of filters 61 to 64. The matching circuit 71 is provided in a signal path between the filter 61 and a fifth switch 55 (selection terminal 551 of the fifth switch 55), which will be described below. The matching circuit 71 is a circuit for performing impedance matching between the filter 61 and the fifth switch 55. The matching circuit 71 has, for example, a configuration including one inductor. It should be noted that the matching circuit 71 is not limited to the configuration including one inductor, and may have, for example, a configuration including a plurality of inductors, or a configuration including a plurality of inductors and a plurality of capacitors.

The matching circuit 72 is provided in a signal path between the filter 62 and the fifth switch 55 (selection terminal 552 of the fifth switch 55). The matching circuit 72 is a circuit for performing impedance matching between the filter 62 and the fifth switch 55. The matching circuit 72 has, for example, a configuration including one inductor.

It should be noted that the matching circuit 72 is not limited to the configuration including one inductor, and may have, for example, a configuration including a plurality of inductors, or a configuration including a plurality of inductors and a plurality of capacitors.

The matching circuit 73 is provided in a signal path between the filter 63 and the fifth switch 55 (selection terminal 554 of the fifth switch 55). The matching circuit 73 is a circuit for performing impedance matching between the filter 63 and the fifth switch 55. The matching circuit 73 has, for example, a configuration including one inductor. It should be noted that the matching circuit 73 is not limited to the configuration including one inductor, and may have, for example, a configuration including a plurality of inductors, or a configuration including a plurality of inductors and a plurality of capacitors.

The matching circuit 74 is provided in a signal path between the filter 64 and the fifth switch 55 (selection terminal 555 of the fifth switch 55). The matching circuit 74 is a circuit for performing impedance matching between the filter 64 and the fifth switch 55. The matching circuit 74 has, for example, a configuration including one inductor. It should be noted that the matching circuit 74 is not limited to the configuration including one inductor, and may have, for example, a configuration including a plurality of inductors, or a configuration including a plurality of inductors and a plurality of capacitors.

(1.1.5) Low Noise Amplifier

The first low noise amplifier 21 is an amplifier that amplifies the reception signals in the first communication band and the second communication band with low noise. The first low noise amplifier 21 is provided in a signal path between a plurality of reception filters 612 and 622 and a signal output terminal 94, which will be described below. The first low noise amplifier 21 includes a first input terminal (not illustrated) and a first output terminal (not illustrated). The first input terminal of the first low noise amplifier 21 is connected to the first input matching circuit 41. The first output terminal of the first low noise amplifier 21 is connected to the external circuit (for example, the signal processing circuit 301) with the signal output terminal 94 interposed therebetween.

The second low noise amplifier 22 is an amplifier that amplifies the reception signals in the third communication band and the fourth communication band with low noise. The second low noise amplifier 22 is provided in a signal path between a plurality of reception filters 632 and 642 and a signal output terminal 95, which will be described below. The second low noise amplifier 22 includes a second input terminal (not illustrated) and a second output terminal (not illustrated). The second input terminal of the second low noise amplifier 22 is connected to the second input matching circuit 42. The second output terminal of the second low noise amplifier 22 is connected to the external circuit (for example, the signal processing circuit 301) with the signal output terminal 95 interposed therebetween.

(1.1.6) Input Matching Circuit

The first input matching circuit 41 is provided in a signal path between the first low noise amplifier 21 and a common terminal 530 of the third switch 53, which will be described below. The first input matching circuit 41 is a circuit for performing impedance matching between the first low noise amplifier 21 and the plurality of reception filters 612 and 622. The first input matching circuit 41 has, for example, a configuration including one inductor. The inductor of the first input matching circuit 41 is provided on an input side of the first low noise amplifier 21. It should be noted that the first input matching circuit 41 is not limited to the configuration including one inductor, and may have, for example, a configuration including a plurality of inductors, or a configuration including a plurality of inductors and a plurality of capacitors.

The second input matching circuit 42 is provided in a signal path between the second low noise amplifier 22 and a common terminal 540 of the fourth switch 54, which will be described below. The second input matching circuit 42 is a circuit for performing impedance matching between the second low noise amplifier 22 and the plurality of reception filters 632 and 642. The second input matching circuit 42 has, for example, a configuration including one inductor. The inductor of the second input matching circuit 42 is provided on an input side of the second low noise amplifier 22. It should be noted that the second input matching circuit 42 is not limited to the configuration including one inductor, and may have, for example, a configuration including a plurality of inductors, or a configuration including a plurality of inductors and a plurality of capacitors.

(1.1.7) Switch

The first switch 51 switches the transmission filter connected to the first power amplifier 11 from among the plurality of transmission filters 611 and 621. In other words, the first switch 51 is a switch for switching a path connected to the first power amplifier 11. The first switch 51 includes a common terminal 510 and a plurality (two in the illustrated example) of selection terminals 511 and 512. The common terminal 510 is connected to the first power amplifier 11. The selection terminal 511 is connected to the transmission filter 611. The selection terminal 512 is connected to the transmission filter 621.

The first switch 51 switches the connection states between the common terminal 510 and the plurality of selection terminals 511 and 512. The first switch 51 is controlled by, for example, a controller (not illustrated). The first switch 51 electrically connects the common terminal 510 and at least one of the plurality of selection terminals 511 and 512 to each other in response to a control signal from the controller.

The second switch 52 switches the transmission filter connected to the second power amplifier 12 from among the plurality of transmission filters 631 and 641. In other words, the second switch 52 is a switch for switching a path connected to the second power amplifier 12. The second switch 52 includes a common terminal 520 and a plurality (two in the illustrated example) of selection terminals 521 and 522. The common terminal 520 is connected to the second power amplifier 12. The selection terminal 521 is connected to the transmission filter 631. The selection terminal 522 is connected to the transmission filter 641.

The second switch 52 switches the connection states between the common terminal 520 and the plurality of selection terminals 521 and 522. The second switch 52 is controlled by, for example, the controller. The second switch 52 electrically connects the common terminal 520 and at least one of the plurality of selection terminals 521 and 522 to each other in response to a control signal from the controller.

The third switch 53 switches the reception filter connected to the first low noise amplifier 21 from among the plurality of reception filters 612 and 622. In other words, the third switch 53 is a switch for switching a path connected to the first low noise amplifier 21. The third switch 53 includes a common terminal 530 and a plurality (two in the illustrated example) of selection terminals 531 and 532. The common terminal 530 is connected to the first low noise amplifier 21. The selection terminal 531 is connected to the reception filter 612. The selection terminal 532 is connected to the reception filter 622.

The third switch 53 switches the connection states between the common terminal 530 and the plurality of selection terminals 531 and 532. The third switch 53 is controlled by, for example, the signal processing circuit 301. The third switch 53 electrically connects the common terminal 530 and at least one of the plurality of selection terminals 531 and 532 to each other in response to a control signal from the RF signal processing circuit 302 of the signal processing circuit 301.

The fourth switch 54 switches the reception filter connected to the second low noise amplifier 22 from among the plurality of reception filters 632 and 642. In other words, the fourth switch 54 is a switch for switching a path connected to the second low noise amplifier 22. The fourth switch 54 includes a common terminal 540 and a plurality (two in the illustrated example) of selection terminals 541 and 542. The common terminal 540 is connected to the second low noise amplifier 22. The selection terminal 541 is connected to the reception filter 632. The selection terminal 542 is connected to the reception filter 642.

The fourth switch 54 switches the connection states between the common terminal 540 and the plurality of selection terminals 541 and 542. The fourth switch 54 is controlled by, for example, the signal processing circuit 301. The fourth switch 54 electrically connects the common terminal 540 and at least one of the plurality of selection terminals 541 and 542 to each other in response to a control signal from the RF signal processing circuit 302 of the signal processing circuit 301.

The fifth switch 55 switches the transmission filter connected to an antenna terminal 91 from among the plurality of transmission filters 611, 621, 631, and 641. The fifth switch 55 switches the reception filter connected to the antenna terminal 91 from among the plurality of reception filters 612, 622, 632, and 642. In other words, the fifth switch 55 is a switch for switching a path connected to an antenna 310. The fifth switch 55 includes a common terminal 550 and a plurality (six in the illustrated example) of selection terminals 551 to 556. The common terminal 550 is connected to the antenna terminal 91. The selection terminal 551 is connected to the transmission filter 611 and the reception filter 612. The selection terminal 552 is connected to the transmission filter 621 and the reception filter 622. The selection terminal 554 is connected to the transmission filter 631 and the reception filter 632. The selection terminal 555 is connected to the transmission filter 641 and the reception filter 642. In the example illustrated in FIG. 15, no circuit is connected to the selection terminals 553 and 556.

The fifth switch 55 switches the connection states between a common terminal 550 and the plurality of selection terminals 551 to 556. The fifth switch 55 is controlled by, for example, the signal processing circuit 301. The fifth switch 55 electrically connects the common terminal 550 and at least one of the plurality of selection terminals 551 to 556 to each other in response to a control signal from the RF signal processing circuit 302 of the signal processing circuit 301. In the present embodiment, the fifth switch 55 is an antenna switch (hereinafter, also referred to as an "antenna switch 55").

(1.1.8) External Connection Terminal

The plurality of external connection terminals 9 include the antenna terminal 91, the two signal input terminals 92 and 93, the two signal output terminals 94 and 95, a coupling terminal 96, and a plurality of ground terminals (not illustrated). The plurality of ground terminals are terminals to which a ground potential is given by being electrically connected to a ground electrode of a circuit board provided in the communication device 300, the circuit board being described below.

The antenna terminal 91 is connected to the antenna 310. In the high frequency module 100, the antenna terminal 91 is connected to the directional coupler 8*b* (first connection terminal 871 of the directional coupler 8*b*). The antenna terminal 91 is connected to the plurality of transmission filters 611, 621, 631, and 641 and the plurality of reception filters 612, 622, 632, and 642 with the directional coupler 8*b*, the filter 601, and the fifth switch 55 interposed therebetween.

Each of the two signal input terminals 92 and 93 is a terminal for inputting the transmission signal from the external circuit (for example, the signal processing circuit 301) to the high frequency module 100. In the high frequency module 100, the signal input terminal 92 is connected to the first power amplifier 11. In the high frequency module 100, the signal input terminal 93 is connected to the second power amplifier 12.

The signal output terminal 94 is a terminal for outputting the reception signal from the first low noise amplifier 21 to the external circuit (for example, the signal processing circuit 301). In the high frequency module 100, the signal output terminal 94 is connected to the first low noise amplifier 21. The signal output terminal 95 is a terminal for outputting the reception signal from the second low noise amplifier 22 to the external circuit (for example, the signal processing circuit 301). In the high frequency module 100, the signal output terminal 95 is connected to the second low noise amplifier 22.

The coupling terminal 96 is a terminal for outputting the signal (detected signal) from the directional coupler 8*b* to the external device (for example, the detector). The coupling terminal 96 is connected to the third connection terminal 873 (see FIG. 9) of the directional coupler 8*b*.

The plurality of ground terminals are terminals to which a ground potential is given by being electrically connected to a ground electrode of an external board (not illustrated) provided in the communication device 300. In the high frequency module 100, the plurality of ground terminals are connected to a ground layer (not illustrated) of a mounting board 10. The ground layer is a circuit ground of the high frequency module 100.

(1.2) Configuration of Communication Device

Next, a configuration of the communication device 300 according to Embodiment 5 will be described with reference to FIG. 15.

As illustrated in FIG. 15, the communication device 300 includes the high frequency module 100, the antenna 310, and the signal processing circuit 301. The communication device 300 further includes a circuit board on which the high frequency module 100 is mounted. The circuit board is, for example, a printed wiring board. The circuit board has the ground electrode to which the ground potential is given.

(1.2.1) Antenna

The antenna 310 is connected to the antenna terminal 91 of the high frequency module 100. The antenna 310 has a transmission function of radiating the transmission signal output from the high frequency module 100 as a radio wave, and a reception function of receiving the reception signal from the outside as the radio wave and outputting the reception signal to the high frequency module 100.

(1.2.2) Signal Processing Circuit

The signal processing circuit 301 includes the RF signal processing circuit 302 and a baseband signal processing circuit 303. The signal processing circuit 301 processes the signal passing through the high frequency module 100. More specifically, the signal processing circuit 301 processes the transmission signal and the reception signal.

The RF signal processing circuit 302 is, for example, a radio frequency integrated circuit (RFIC). The RF signal processing circuit 302 performs signal processing on the high frequency signal.

The RF signal processing circuit 302 performs the signal processing such as up-conversion on the high frequency signal output from the baseband signal processing circuit 303, and outputs the high frequency signal on which the signal processing has been performed to the high frequency module 100. In addition, the RF signal processing circuit 302 performs the signal processing such as down conversion on the high frequency signal output from the high frequency module 100, and outputs the high frequency signal on which the signal processing has been performed to the baseband signal processing circuit 303.

The baseband signal processing circuit 303 is, for example, a baseband integrated circuit (BBIC). The baseband signal processing circuit 303 performs predetermined signal processing on the transmission signal from an outside of the signal processing circuit 301. The reception signal processed by the baseband signal processing circuit 303 is, for example, used as an image signal for an image display as an image signal or used as an audio signal for a call.

The RF signal processing circuit 302 also has a function as a control unit that controls the connection of each of the third switch 53, the fourth switch 54, the fifth switch 55, the first changeover switch 85*a*, the second changeover switch 85*b*, the third changeover switch 86*a*, the fourth changeover switch 86*b*, the fifth changeover switch 88*a*, the sixth changeover switch 88*b*, the seventh changeover switch 85*c*, the eighth changeover switch 85*d*, the ninth changeover switch 88*c*, and the tenth changeover switch 88*d*, which are provided in the high frequency module 100, based on the transmission and reception of the high frequency signal (transmission signal and reception signal). Specifically, the RF signal processing circuit 302 switches the connection of each of the third switch 53, the fourth switch 54, the fifth switch 55, the first changeover switch 85*a*, the second changeover switch 85*b*, the third changeover switch 86*a*, the fourth changeover switch 86*b*, the fifth changeover switch 88*a*, the sixth changeover switch 88*b*, the seventh changeover switch 85*c*, the eighth changeover switch 85*d*, the ninth changeover switch 88*c*, and the tenth changeover switch 88*d*, which are provided in the high frequency module 100, in response to a control signal (not illustrated). The control unit may be provided outside the RF signal processing circuit 302, or may be provided in the high frequency module 100 or the baseband signal processing circuit 303, for example.

(2) Structure of High Frequency Module

Next, a structure of the high frequency module 100 will be described with reference to FIGS. 16 and 17.

As illustrated in FIGS. 16 and 17, the high frequency module 100 includes the mounting board 10, a plurality of electronic components, and the plurality of external connection terminals 9. The high frequency module 100 further includes a first resin layer 16, a second resin layer (not illustrated), and a metal electrode layer 17.

The high frequency module 100 can be electrically connected to the external board (not illustrated). The external board corresponds to, for example, a motherboard of the communication device 300 such as a cellular phone and a communication device. It should be noted that a case in which the high frequency module 100 is directly mounted on the external board is included, and a case in which the high frequency module 100 is indirectly mounted on the external board is also included. The case in which the high frequency module 100 is indirectly mounted on the external board is a case in which the high frequency module 100 is mounted on another high frequency module mounted on the external board.

(2.1) Mounting Board

As illustrated in FIGS. 16 and 17, the mounting board 10 includes a first main surface 101 and a second main surface 102. The first main surface 101 and the second main surface 102 face each other in a thickness direction D1 of the mounting board 10. In a case in which the high frequency module 100 is provided on the external board, the second main surface 102 faces a main surface of the external board on the mounting board 10 side. The mounting board 10 is a double-sided mounting board in which the plurality of electronic components are mounted on the first main surface 101 and the second main surface 102.

The mounting board 10 is a multilayer board in which a plurality of dielectric layers are laminated. The mounting board 10 includes a plurality of conductive layers and a plurality of via conductors (including through-electrodes). The plurality of dielectric layers include a first layer 10*a*, a second layer 10*b*, a third layer 10*c*, a fourth layer 10*d*, and a fifth layer 10*e*. The plurality of conductive layers include the ground layer at the ground potential. The plurality of via conductors are used for electrical connection between elements disposed on the first main surface 101 and the second main surface 102, and the conductive layers of the mounting board 10. The plurality of via conductors are used for electrical connection between the elements disposed on the first main surface 101 and the elements disposed on the second main surface 102, and electrical connection between the conductive layers of the mounting board 10 and the external connection terminals 9.

The plurality (nine in the illustrated example) of external connection terminals 9 are disposed on one surface (back surface) of the first layer 10*a*. A conductor pattern portion that forms the first sub-line 82*a* is formed on one surface (front surface) of the second layer 10*b*. A conductor pattern portion that forms the main line 81 is formed on one surface (front surface) of the third layer 10*c*. A conductor pattern portion that forms the second sub-line 82*b* is formed on one surface (front surface) of the fourth layer 10*d*. A plurality (four in the illustrated example) of terminals 103 to 106 are formed on the fifth layer 10*e*.

The terminal 103 corresponds to the first end 821*a* of the first sub-line 82*a*, and is connected to the first end 821*a* of the first sub-line 82*a* with the via conductor (not illustrated) interposed therebetween. The terminal 104 corresponds to the second end 822*a* of the first sub-line 82*a*, and is connected to the second end 822*a* of the first sub-line 82*a* with the via conductor (not illustrated) interposed therebetween. The terminal 105 corresponds to the second end 822*b* of the second sub-line 82*b*, and is connected to the second end 822*b* of the second sub-line 82*b* with the via conductor (not illustrated) interposed therebetween. The terminal 106 corresponds to the first end 821*b* of the second sub-line 82*b*, and is connected to the first end 821*b* of the second sub-line 82*b* with the via conductor (not illustrated) interposed therebetween.

In the mounting board 10, the first layer 10*a*, the second layer 10*b*, the third layer 10*c*, the fourth layer 10*d*, and the fifth layer 10*e* are laminated in this order from a lower side. Accordingly, the main line 81, the first sub-line 82*a*, and the second sub-line 82*b* are provided inside the mounting board (multilayer board) 10. An IC chip 13 is disposed on the first main surface 101 (front surface of the fifth layer 10*e*) of the mounting board 10. The IC chip 13 is an IC chip (IC component) including at least the fifth changeover switch 88*a*, the sixth changeover switch 88*b*, the ninth changeover switch 88*c*, the tenth changeover switch 88*d*, the first termination circuit 84, and the third termination circuit 84*f*. As described above, since the main line 81, the first sub-line 82*a*, and the second sub-line 82*b* are provided inside the mounting board 10, and the IC chip 13 is disposed on the first main surface 101 of the mounting board 10, the electromagnetic field coupling between the main line 81 and the first termination circuit 84 and the third termination circuit 84*f* can be restrained. Since the IC chip 13 includes the fifth changeover switch 88*a*, the sixth changeover switch 88*b*, and the first termination circuit 84, the first termination circuit 84, the fifth changeover switch 88*a*, and the sixth changeover switch 88*b* are adjacent to each other. Therefore, the impedance of the first termination circuit 84 can be adjusted with high accuracy. Similarly, since the IC chip 13 includes the ninth changeover switch 88*c*, the tenth changeover switch 88*d*, and the third termination circuit 84*f*, the third termination circuit 84*f*, the ninth changeover switch 88*c*, and the tenth changeover switch 88*d* are adjacent to each other. Therefore, the impedance of the first termination circuit 84 can be adjusted with high accuracy. It should be noted that the IC chip 13 further includes the fifth switch (antenna switch) 55, the first changeover switch 85*a*, the second changeover switch 85*b*, the third changeover switch 86*a*, the fourth changeover switch 86*b*, the seventh changeover switch 85*c*, and the eighth changeover switch 85*d*. In other words, the fifth switch 55 is integral with the first changeover switch 85*a*, the second changeover switch 85*b*, the third changeover switch 86*a*, the fourth changeover switch 86*b*, the fifth changeover switch 88*a*, the sixth changeover switch 88*b*, the seventh changeover switch 85*c*, the eighth changeover switch 85*d*, the ninth changeover switch 88*c*, and the tenth changeover switch 88*d*.

It should be noted that, in the high frequency module 100 according to Embodiment 1, a first group of electronic components among the plurality of electronic components are disposed on the first main surface 101 of the mounting board 10. The first group of electronic components includes the first power amplifier 11, the second power amplifier 12, the plurality of filters 60 to 64, the first output matching circuit 31, the second output matching circuit 32, the first input matching circuit 41, and the second input matching circuit 42.

In addition, in the high frequency module 100, a second group of electronic components among the plurality of electronic components are disposed on the second main surface 102 of the mounting board 10. The second group of electronic components includes the first low noise amplifier 21 and the second low noise amplifier 22.

It should be noted that the first switch 51, the second switch 52, the third switch 53, the fourth switch 54, the matching circuits 71 to 74, and the second termination circuit 83 are not illustrated in both FIGS. 16 and 17, and may be disposed on any one of the first main surface 101 and the second main surface 102 of the mounting board 10.

(2.2) Electronic Component

As described above, the plurality of electronic components include the first group of electronic components and the second group of electronic components. The first group of electronic components is disposed on the first main surface 101 of the mounting board 10. The first group of electronic components includes a plurality of first electronic components constituting the plurality of filters 60 to 64, a plurality of second electronic components constituting the first power amplifier 11 and the second power amplifier 12, a plurality of third electronic components constituting the first output matching circuit 31, the second output matching circuit 32, the first input matching circuit 41, and the second input matching circuit 42, and a fourth electronic component constituting the IC chip 13.

Each of the filters 601 and 602 constituting the filter 60, and the plurality of transmission filters 611, 621, 631, and 641 and the plurality of reception filters 612, 622, 632, and 642 constituting the plurality of filters 61 to 64 is, for example, an acoustic wave filter including a plurality of serial arm resonators and a plurality of parallel arm resonators. The acoustic wave filter is, for example, a surface acoustic wave (SAW) filter using a surface acoustic wave. Further, each of the plurality of filters 601 and 602, each of the plurality of transmission filters 611, 621, 631, and 641, and each of the plurality of reception filters 612, 622, 632, and 642 may include at least one of an inductor and a capacitor connected in series with any one of the plurality of serial arm resonators, or may include an inductor and a capacitor connected in series with any one of the plurality of parallel arm resonators.

The second group of electronic components is disposed on the second main surface 102 of the mounting board 10. The second group of electronic components includes a plurality of fifth electronic components constituting the first low noise amplifier 21 and the second low noise amplifier 22.

(2.3) External Connection Terminal

The plurality of external connection terminals 9 are terminals for electrically connecting the mounting board 10 and the external board (not illustrated) to each other.

The plurality of external connection terminals 9 are disposed on the second main surface 102 of the mounting board 10. The "external connection terminal 9 is disposed on the second main surface 102 of the mounting board 10" includes that the external connection terminal 9 is mechanically connected to the second main surface 102 of the mounting board 10 and that the external connection terminal 9 is electrically connected to the mounting board 10 (appropriate conductor portion of the mounting board 10). Materials of the plurality of external connection terminals 9 are, for example, metal (for example, copper, copper alloy, or the like). Each of the plurality of external connection terminals 9 is a columnar electrode. The columnar electrode is bonded to the conductor portion of the mounting board 10, for example, with solder, but the bonding is not limited to bonding with solder, and bonding with, for example, a conductive adhesive (for example, a conductive paste) may be performed, or direct bonding may be performed. In plan view in the thickness direction D1 of the mounting board 10, each of the plurality of external connection terminals 9 has a circular shape.

(2.4) Resin Layer

The first resin layer 16 is disposed on the first main surface 101 of the mounting board 10. The first resin layer 16 covers the first group of electronic components disposed on the first main surface 101 of the mounting board 10. The first resin layer 16 contains resin (for example, epoxy resin). The first resin layer 16 may contain a filler in addition to the resin.

The second resin layer is disposed on the second main surface 102 of the mounting board 10. The second resin layer covers the second group of electronic components and the plurality of external connection terminals 9, which are disposed on the second main surface 102 of the mounting board 10. The second resin layer contains resin (for example, epoxy resin). The second resin layer may contain a filler in addition to the resin. A material of the second resin layer may be the same as or different from the material of the first resin layer 16.

(2.5) Metal Electrode Layer

The metal electrode layer 17 has conductivity. The metal electrode layer 17 is provided for the electromagnetic shield of the inside and the outside of the high frequency module 100. Although the metal electrode layer 17 has a multilayer structure in which a plurality of metal layers are laminated, the metal electrode layer 17 is not limited to the multilayer structure, and may have one metal layer. One metal layer includes one or a plurality of types of metal. The metal electrode layer 17 covers a main surface of the first resin layer 16 on a side opposite to the mounting board 10 side, an outer peripheral surface of the first resin layer 16, an outer peripheral surface of the mounting board 10, and an outer peripheral surface of the second resin layer. The metal electrode layer 17 is in contact with at least a part of an outer peripheral surface of the ground layer (not illustrated) of the mounting board 10. Accordingly, the potential of the metal electrode layer 17 can be made the same as the potential of the ground layer.

(3) Detailed Structure of Each Component of High Frequency Module

(3.1) Mounting Board

The mounting board 10 is, for example, a multilayer board including the plurality of dielectric layers and the plurality of conductive layers. The plurality of dielectric layers and the plurality of conductive layers are laminated in the thickness direction D1 of the mounting board 10. The plurality of conductive layers are formed in a predetermined pattern determined for each layer. Each of the plurality of conductive layers includes one or a plurality of conductor portions in a plane perpendicular to the thickness direction D1 of the mounting board 10. A material of each conductive layer is, for example, copper. The plurality of conductive layers include the ground layer (not illustrated). In the high frequency module 100, the plurality of ground terminals and the ground layer are electrically connected to each other with the via conductor of the mounting board 10 or the like interposed therebetween. The mounting board 10 is, for example, a low temperature co-fired ceramics (LTCC) board. The mounting board 10 is not limited to the LTCC board, and may be, for example, a printed wiring board, a high temperature co-fired ceramics (HTCC) board, or a resin multilayer board.

The mounting board 10 is not limited to the LTCC board, and may be, for example, a wiring structure. The wiring structure is, for example, a multilayer structure. The multilayer structure includes at least one insulating layer and at least one conductive layer. The insulating layer is formed in a predetermined pattern. In a case in which a plurality of insulating layers are present, the plurality of insulating layers are formed in a predetermined pattern determined for each layer. The conductive layer is formed in a predetermined pattern different from the predetermined pattern of the insulating layer. In a case in which a plurality of conductive layers are present, the plurality of conductive layers are formed in a predetermined pattern determined for each layer. The conductive layer may include one or a plurality of rewiring portions. In the wiring structure, among two surfaces facing each other in a thickness direction of the multilayer structure, a first surface is the first main surface 101 of the mounting board 10, and a second surface is the second main surface 102 of the mounting board 10. The wiring structure may be, for example, an interposer. The interposer may be an interposer using a silicon board or may be a multilayer board.

The first main surface 101 and the second main surface 102 of the mounting board 10 are separated from each other in the thickness direction D1 of the mounting board 10, and intersect the thickness direction D1 of the mounting board 10. The first main surface 101 of the mounting board 10 is, for example, perpendicular to the thickness direction D1 of the mounting board 10, and may include, for example, a side surface or the like of the conductor portion as a surface that is not perpendicular to the thickness direction D1 of the mounting board 10. In addition, the second main surface 102 of the mounting board 10 is, for example, perpendicular to the thickness direction D1 of the mounting board 10, and may include, for example, a side surface or the like of the conductor portion as a surface that is not perpendicular to the thickness direction D1 of the mounting board 10. Further, the first main surface 101 and the second main surface 102 of the mounting board 10 may be formed with a recess and a protrusion, a recess portion, or a protrusion portion.

(3.2) Filter

A detailed structure of the plurality of filters 60 to 64 will be described. Hereinafter, the plurality of filters 60 to 64 will be referred to as the filter without necessarily distinction.

The filter formed by the first electronic component is an acoustic wave filter of a bare chip. The first electronic component includes a board, a circuit portion, a plurality of pad electrodes, a piezoelectric layer, and a low acoustic velocity film. The board includes a first surface and a second surface facing each other in a thickness direction of the board. The circuit portion includes a plurality of interdigital transducer (IDT) electrodes. The plurality of pad electrodes are formed on the first surface of the board and are connected to the circuit portion. The plurality of pad electrodes are connected to the mounting board 10 with a plurality of bumps interposed therebetween. The low acoustic velocity film is provided on the first surface of the board. The piezoelectric layer is provided on the low acoustic velocity film. The plurality of IDT electrodes are provided on the piezoelectric layer. The plurality of IDT electrodes are disposed in a space formed between the board and the mounting board 10 by the plurality of pad electrodes, the plurality of bumps, the board, and the mounting board 10, and the first resin layer 16. The first electronic component has a rectangular shape in plan view in the thickness direction of the board, but may have, for example, a square shape.

The low acoustic velocity film is located away from an outer periphery of the board in plan view in the thickness direction of the board. The first electronic component further includes an insulating layer. The insulating layer covers a region of the first surface of the board that is not covered with the low acoustic velocity film. The insulating layer has an electrical insulating property. The insulating layer is formed along the outer periphery of the board on the first surface of the board. The insulating layer surrounds the plurality of IDT electrodes. In plan view in a thickness direction of the first electronic component, the insulating layer has a frame shape (for example, a rectangular frame shape). A part of the insulating layer overlaps an outer peripheral portion of the piezoelectric layer in the thickness direction of the first electronic component. An outer peripheral surface of the piezoelectric layer and an outer peripheral surface of the low acoustic velocity film are covered with the insulating layer. A material of the insulating layer is epoxy resin, polyimide, or the like.

The plurality of pad electrodes are provided on the first surface of the board with the insulating layer interposed therebetween.

A material of the piezoelectric layer is, for example, lithium niobate or lithium tantalate. A material of the low acoustic velocity film is, for example, silicon oxide. In the low acoustic velocity film, an acoustic velocity of a bulk wave propagating in the low acoustic velocity film is lower than an acoustic velocity of a bulk wave propagating in the piezoelectric layer. The material of the low acoustic velocity film is not limited to silicon oxide, and may be, for example, silicon oxide, glass, silicon oxynitride, tantalum oxide, a compound of silicon oxide with fluorine, carbon, or boron, or a material containing the above-described materials as main components.

The board is, for example, a silicon board. That is, a material of the board of the first electronic component is silicon. In the board, an acoustic velocity of a bulk wave propagating in the board is higher than an acoustic velocity of an acoustic wave propagating in the piezoelectric layer. Here, the bulk wave propagating in the board is a bulk wave having the lowest acoustic velocity among the plurality of bulk waves propagating in the board. In the present embodiment, a high acoustic velocity member is formed by the board and the low acoustic velocity film provided on the board. In addition, in the present embodiment, the board is a support board formed by the silicon board. It should be noted that the material of the board is not limited to silicon, and may be, for example, a material containing, as a main component, any one of gallium arsenide, aluminum arsenide, indium arsenide, indium phosphide, gallium phosphide, indium antimonide, gallium nitride, indium nitride, aluminum nitride, silicon, germanium, silicon carbide, and gallium(III) oxide, or a material containing, as a main component, a multi-component mixed crystal material consisting of two or more of these materials.

The first electronic component may further include a high acoustic velocity film provided between the board and the low acoustic velocity film. In the high acoustic velocity film, an acoustic velocity of a bulk wave propagating in the high acoustic velocity film is higher than an acoustic velocity of an acoustic wave propagating in the piezoelectric layer. A material of the high acoustic velocity film is, for example, silicon nitride, but is not limited to silicon nitride, and may be at least one material selected from the group consisting of diamond-like carbon, aluminum nitride, aluminum oxide, silicon carbide, silicon nitride, silicon, sapphire, lithium tantalate, lithium niobate, quartz, zirconia, cordierite, mullite, steatite, forsterite, magnesia, and diamond.

In addition, the first electronic component may include, for example, a close contact layer interposed between the low acoustic velocity film and the piezoelectric layer. The close contact layer is made of, for example, resin (epoxy resin and polyimide resin). The first electronic component may include a dielectric film between the low acoustic velocity film and the piezoelectric layer, on the piezoelectric layer, or under the low acoustic velocity film.

(3.3) Power Amplifier

Each of the plurality of second electronic components is an IC chip constituting the first power amplifier 11 or the second power amplifier 12. Each of the plurality of second electronic components includes a board and a circuit portion. The board includes a first surface and a second surface facing each other in a thickness direction of the board. The board is, for example, a gallium arsenide board. That is, a material of the board of the second electronic component is gallium arsenide. The circuit portion includes at least one transistor formed on the first surface of the board. The circuit portion has a function of amplifying the transmission signal input to the first power amplifier 11 or the second power amplifier 12. The transistor is, for example, a heterojunction bipolar transistor (HBT). Each of the first power amplifier 11 and the second power amplifier 12 may include, for example, a capacitor for direct current blocking. Each of the plurality of second electronic components is flip-chip mounted on the first main surface 101 of the mounting board 10 such that the first surface of the board is on the first main surface 101 side of the mounting board 10. In plan view in the thickness direction D1 of the mounting board 10, each of outer edges of the plurality of second electronic components has a quadrangular shape.

It should be noted that the material of the board is not limited to gallium arsenide, and may be, for example, a material containing, as a main component, any one of gallium arsenide, aluminum arsenide, indium arsenide, indium phosphide, gallium phosphide, indium antimonide, gallium nitride, indium nitride, aluminum nitride, silicon, germanium, silicon germanium, silicon carbide, gallium(III) oxide, and gallium bismuth, or a material containing, as a main component, a multi-component mixed crystal material consisting of two or more of these materials.

(3.4) Matching Circuit

Each of the plurality of third electronic components is, for example, a chip component constituting the inductor or the capacitor of the first output matching circuit 31, the second output matching circuit 32, the first input matching circuit 41, or the second input matching circuit 42. Each of the plurality of third electronic components is a surface mount device (SMD). Each of the plurality of third electronic components has a rectangular parallelepiped shape. In plan view in the thickness direction D1 of the mounting board 10, each of outer edges of the plurality of third electronic components has a quadrangular shape.

(3.5) IC Chip

A plurality of fourth electronic components are chip components constituting the IC chip 13. The plurality of fourth electronic components include a board and a circuit portion. The board has a first surface and a second surface facing each other. The board is, for example, a silicon board. The circuit portion includes a plurality of FETs as a plurality of switching elements. Each of the plurality of switching elements is not limited to the FET, and may be, for example, a bipolar transistor. Each of the plurality of fourth electronic components is flip-chip mounted on the second main surface 102 of the mounting board 10 such that the first surface of the board is on the second main surface 102 side of the mounting board 10. In plan view in the thickness direction D1 of the mounting board 10, each of outer edges of the plurality of fourth electronic components has a quadrangular shape.

Here, the fourth electronic components constituting the IC chip 13 include, as the FET, a first FET constituting the first changeover switch 85*a*, a second FET constituting the second changeover switch 85*b*, a third FET constituting the third changeover switch 86*a*, a fourth FET constituting the fourth changeover switch 86*b*, a fifth FET constituting the fifth changeover switch 88*a*, a sixth FET constituting the sixth changeover switch 88*b*, a seventh FET constituting the seventh changeover switch 85*c*, an eighth FET constituting the eighth changeover switch 85*d*, a ninth FET constituting the ninth changeover switch 88*c*, and a tenth FET constituting the tenth changeover switch 88*d*. That is, the first changeover switch 85*a* includes the first FET, the second changeover switch 85*b* includes the second FET, the third changeover switch 86*a* includes the third FET, the fourth changeover switch 86*b* includes the fourth FET, the fifth changeover switch 88*a* includes the fifth FET, the sixth changeover switch 88*b* includes the sixth FET, the seventh changeover switch 85*c* includes the seventh FET, the eighth changeover switch 85*d* includes the eighth FET, the ninth changeover switch 88*c* includes the ninth FET, and the tenth changeover switch 88*d* includes the tenth FET.

(3.6) Low Noise Amplifier

Each of the plurality of fifth electronic components is an IC chip constituting the first low noise amplifier 21 or the second low noise amplifier 22. Each of the plurality of fifth electronic components includes a board and a circuit portion. The board has a first surface and a second surface facing each other. The board is, for example, a silicon board. The circuit portion is formed on the first surface of the board. The circuit portion has a function of amplifying the reception signal input to the first low noise amplifier 21 or the second low noise amplifier 22. Each of the plurality of fifth electronic components is flip-chip mounted on the second main surface 102 of the mounting board 10 such that the first surface of the board is on the second main surface 102 side of the mounting board 10. In plan view in the thickness direction D1 of the mounting board 10, each of outer edges of the plurality of fifth electronic components has a quadrangular shape.

(4) Layout of High Frequency Module

Next, a layout of the high frequency module 100 will be described.

In the high frequency module 100, as illustrated in FIG. 17, in plan view in the thickness direction D1 (see FIG. 16) of the mounting board 10, the main line 81, the first sub-line 82*a*, the second sub-line 82*b*, and the IC chip 13 overlap each other. Accordingly, it is possible to shorten a connection distance between the IC chip 13 and the directional coupler 8*b*, and as a result, it is possible to suppress the occurrence of an unnecessary inductor. It should be noted that the IC chip 13 may overlap any one or any two of the main line 81, the first sub-line 82*a*, and the second sub-line 82*b* in plan view in the thickness direction D1 of the mounting board 10. That is, the IC chip 13 need only overlap at least one of the main line 81, the first sub-line 82*a*, and the second sub-line 82*b* in plan view in the thickness direction D1 of the mounting board 10.

(5) Effect

Since the high frequency module 100 and the communication device 300 according to Embodiment 5 include the directional coupler 8*b* as described above, it is possible to suppress the differences in insertion loss and the phase of the signal transmitted through the main line 81 of the directional coupler 8*b* between the first and second modes in which detection is performed, and the third mode in which the detection is not performed, and between the fourth and fifth modes in which the detection is performed, and the sixth mode in which the detection is not performed.

In addition, in the high frequency module 100 according to Embodiment 5, as described above, the fifth switch (antenna switch) 55 is included in the IC chip 13 together with the first changeover switch 85*a*, the second changeover switch 85*b*, the third changeover switch 86*a*, the fourth changeover switch 86*b*, the fifth changeover switch 88*a*, the sixth changeover switch 88*b*, the seventh changeover switch 85*c*, the eighth changeover switch 85*d*, the ninth changeover switch 88*c*, and the tenth changeover switch 88*d*, and is integral with the first changeover switch 85*a*, the second changeover switch 85*b*, the third changeover switch 86*a*, the fourth changeover switch 86*b*, the fifth changeover switch 88*a*, the sixth changeover switch 88*b*, the seventh changeover switch 85*c*, the eighth changeover switch 85*d*, the ninth changeover switch 88*c*, and the tenth changeover switch 88*d*. Accordingly, it is possible to reduce the size of the high frequency module 100 as compared with a case in which the fifth switch 55 is included in a separate IC chip from the first changeover switch 85*a*, the second changeover switch 85*b*, the third changeover switch 86a, the fourth changeover switch 86b, the fifth changeover switch 88a, the sixth changeover switch 88b, the seventh changeover switch 85c, the eighth changeover switch 85d, the ninth changeover switch 88c, and the tenth changeover switch 88d. The main line 81, the first sub-line 82a, and the second sub-line 82b overlap the IC chip 13 in plan view in the thickness direction D1 of the mounting board 10. Accordingly, it is possible to shorten a connection distance between the IC chip 13 and the directional coupler 8b, and as a result, it is possible to suppress the occurrence of an unnecessary inductor.

It should be noted that the plurality of electronic components constituting the signal processing circuit 301 may be mounted on the circuit board described above, or may be mounted on a circuit board (second circuit board) different from the circuit board on which the high frequency module 100 is mounted (first circuit board). In other words, the circuit board on which the signal processing circuit 301 is mounted and the circuit board on which the high frequency module 100 is mounted may be different circuit boards.

OTHER MODIFICATION EXAMPLES

Embodiments 1 to 5 and the like described above are merely one of various embodiments of the present disclosure. Embodiments 1 to 5 and the like described above can have various modifications according to the design and the like, and different components of different embodiments may be combined as appropriate.

In the high frequency module 100, the metal electrode layer 17 is not limited to a case of covering the entire main surface of the first resin layer 16 on a side opposite to the mounting board 10 side, and may cover at least a part of the main surface of the first resin layer 16.

Each of the plurality of filters 601 and 602, each of the plurality of transmission filters 611, 621, 631, and 641, and each of the plurality of reception filters 612, 622, 632, and 642 are not limited to the surface acoustic wave filter, and may be, for example, a bulk acoustic wave (BAW) filter. A resonator in the BAW filter is, for example, a film bulk acoustic resonator (FBAR) or a solidly mounted resonator (SMR). The BAW filter has a board. The board is, for example, a silicon board.

Each of the plurality of filters 601 and 602, each of the plurality of transmission filters 611, 621, 631, and 641, and each of the plurality of reception filters 612, 622, 632, and 642 are not limited to the ladder filter, and may be, for example, a longitudinally coupled resonator-type surface acoustic wave filter.

The acoustic wave filter described above is the acoustic wave filter that uses the surface acoustic wave or the bulk acoustic wave, and is not limited to this, and may be, for example, an acoustic wave filter that uses a boundary acoustic wave, a plate wave, or the like.

The communication device 300 and the high frequency module 100 according to Embodiment 5 may include any one of the directional couplers 8, 8a, and 8c instead of the directional coupler 8b.

In addition, the number of sub-lines 82 is one in the directional couplers 8 and 8a according to Embodiments 1 and 2, and the number of sub-lines 82 is two in the directional couplers 8b and 8c according to Embodiments 2 to 5, but the number of sub-lines 82 is not limited to one or two, and may be, for example, three or more.

In addition, instead of each of the first termination circuit 84 and the third termination circuit 84f, any one of the first termination circuits 84a, 84b, 84c, and 84d may be provided as the directional couplers 8b and 8c according to Embodiments 3 to 5.

In addition, the directional couplers 8 to 8c according to Embodiments 1 to 5 may include at least one of the variable resistor, the variable capacitor, and the variable inductor as the second termination circuit 83.

The first termination circuit 84e of the directional coupler 8a according to Embodiment 2 includes the two resistors, but any one of the first circuits 841a, 841b, 841c, and 841d may be provided instead of each resistor. The first termination circuit 84e may include a single resistor or any one of the first circuits 841a, 841b, 841c, and 841d instead of the two resistors.

In addition, in the directional couplers 8b and 8c according to Embodiments 3 to 5, the first termination circuit 84 and the third termination circuit 84f are connected to the ground, but similarly to the first termination circuit 84e according to Embodiment 2, the first termination circuit 84 and the third termination circuit 84f may form a closed circuit with the first sub-line 82a or the first sub-line 82a, and the second sub-line 82b without necessarily being connected to the ground.

In addition, the directional couplers 8b and 8c according to Embodiments 3 to 5 include the first termination circuit 84 that terminates the first end 821a and the second end 822a of the first sub-line 82a, and the third termination circuit 84f that terminates the second end 822b of the first sub-line 82a and the first end 821a of the second sub-line 82b, but may further include a termination circuit that terminates the first end 821b and the second end 822b of the second sub-line 82b.

In addition, the directional couplers 8, 8a, 8b, and 8c according to Embodiments 1 to 5 are the bidirectional couplers that can detect each of the high frequency signal transmitted through the main line 81 from the first end 811 to the second end 812 and the high frequency signal transmitted through the main line 81 from the second end 812 to the first end 811, but may be directional couplers that can detect only the high frequency signal transmitted from the first end 811 to the second end 812 of the main line 81. For example, in the directional couplers 8 and 8a according to Embodiments 1 and 2, the second changeover switch 85b and the fourth changeover switch 86b, the path that connects the first end 821 of the sub-line 82 and the terminal 853 of the second changeover switch 85b, the path that connects the third connection terminal 873 and the terminal 854 of the second changeover switch 85b, and the path that connects the second end 822 of the sub-line 82 and the terminal 863 of the fourth changeover switch 86b, and the path that connects the second termination circuit 83 and the terminal 864 of the fourth changeover switch 86b need not be provided. Similarly, for example, in the directional couplers 8b and 8c according to Embodiments 3 to 5, the second changeover switch 85b, the fourth changeover switch 86b, the eighth changeover switch 85d, and the path of which one end is connected to any one of the terminals of the second changeover switch 85b, the fourth changeover switch 86b, and the eighth changeover switch 85d need not be provided.

In the present specification, the expression "A first element is connected to a second element" includes a case in which the first element and the second element are directly connected to each other and a case in which the first element and the second element are indirectly connected to each other with another element interposed therebetween.

In the present specification, "An element is disposed on a first main surface of a board" includes a case in which the element is directly mounted on the first main surface of the board, as well as a case in which the element is disposed in a space on the first main surface side out of the space on the first main surface side and a space on the second main surface side, which are separated by the board. In other words, "An element is disposed on a first main surface of a board" includes a case in which the element is mounted on the first main surface of the board with another circuit element, an electrode, or the like interposed therebetween. The element is, for example, the first group of electronic components, but is not limited to the first group of electronic components. The board is, for example, the mounting board 10. In a case in which the board is the mounting board 10, the first main surface is the first main surface 101, and the second main surface is the second main surface 102.

In the present specification, "An element is disposed on a second main surface of a board" includes a case in which the element is directly mounted on the second main surface of the board, as well as a case in which the element is disposed in a space on the second main surface side out of the space on the first main surface side and a space on the second main surface side, which are separated by the board. In other words, "An element is disposed on a second main surface of a board" includes a case in which the element is mounted on the second main surface of the board with another circuit element, an electrode, or the like interposed therebetween. The element is, for example, the second group of electronic components, but is not limited to the second group of electronic components. The board is, for example, the mounting board 10. In a case in which the board is the mounting board 10, the first main surface is the first main surface 101, and the second main surface is the second main surface 102.

(Aspect)

The present specification discloses the following aspects.

A first aspect provides a directional coupler (8; 8*a*; 8*b*; 8*c*) including a main line (81), a sub-line (82), a first termination circuit (84 to 84*d*; 84*e*), a second termination circuit (83), and a switch (88*a*, 88*b*). The sub-line (82; 82*a*) has a first end (821; 821*a*) and a second end (822; 822*a*). The first termination circuit (84 to 84*d*; 84*e*) and the second termination circuit (83) terminate the first end (821; 821*a*) and the second end (822; 822*a*) of the sub-line (82; 82*a*). The switch (88*a*, 88*b*) switches connection and disconnection between the sub-line (82; 82*a*) and the first termination circuit (84 to 84*d*; 84*e*).

According to this aspect, the sub-line (82; 82*a*) and the first termination circuit (84 to 84*d*; 84*e*) are not connected to each other in a case in which the signal transmitted through the main line (81) is detected by using the sub-line (82; 82*a*), and the sub-line (82; 82*a*) and the first termination circuit (84 to 84*d*; 84*e*) can be connected to each other in a case in which the sub-line (82; 82*a*) is not used to detect the signal transmitted through the main line (81). Accordingly, the degree of the change in the impedance of the sub-line (82; 82*a*) for the signal transmitted through the main line (81) can be suppressed regardless of whether or not the external circuit is connected to the sub-line (82; 82*a*). Therefore, the degrees of the change in the insertion loss of the main line (81) and the phase change of the signal transmitted through the main line (81) depending on whether or not the sub-line (82; 82*a*) is used can be reduced.

A second aspect provides the directional coupler (8; 8*b*; 8*c*) according to the first aspect, in which the first termination circuit (84 to 84*d*) includes a first circuit (841 to 841*d*) and a second circuit (842 to 842*d*). The first circuit (841 to 841*d*) has a third end (8411) and a fourth end (8412). The second circuit has a fifth end (8421) and a sixth end (8422). The third end (8411) of the first circuit (841 to 841*d*) is connected to the first end (821; 821*a*) of the sub-line (82; 82*a*). The fourth end (8412) of the first circuit (841 to 841*d*) is connected to a ground. The fifth end (8421) of the second circuit (842 to 842*d*) is connected to the second end (822; 822*a*) of the sub-line (82; 82*a*). The sixth end (8422) of the second circuit (842 to 842*d*) is connected to the ground.

According to this aspect, since the second end (8412) of the first circuit (841 to 841*d*) of the first termination circuit (84 to 84*d*) and the second end (8422) of the second circuit (842 to 842*d*) are connected to the ground, even in a case in which the main line (81) transmits a signal in the high frequency band, the degrees of the change in the insertion loss of the main line (81) and the phase change of the signal transmitted by the main line (81) can be reduced.

A third aspect provides the directional coupler (8) according to the first or second aspect, in which the first termination circuit (84*d*) and the second termination circuit (83) include at least one of a variable resistor (8434), a variable capacitor (8435), and a variable inductor (8436).

According to this aspect, for example, the impedances of the first termination circuit (84*d*) and the second termination circuit (83) can be adjusted after the directional coupler (8) is manufactured. Therefore, for example, the impedance of the first termination circuit (84*d*) can be optimized for the frequency band of the signal transmitted through the main line (81), and the difference in the insertion loss of the main line (81) and the phase difference of the high frequency signal can be minimized between a case in which the sub-line (82; 82*a*) is used and a case in which the sub-line (82; 82*a*) is not used.

A fourth aspect provides the directional coupler (8*b*; 8*c*) according to any one of the first to third aspects, further including a second sub-line (82*b*), a third termination circuit (84*f*), and a second switch (88*c*, 88*d*). The second sub-line (82*b*) is connected in series with a first sub-line (82*a*) that is the sub-line (82). The second switch (88*c*, 88*d*) is different from a first switch (88*a*, 88*b*) that is the switch. The third termination circuit (84*f*) is connected to a series circuit (82*c*; 82*d*) of the first sub-line (82*a*) and the second sub-line (82*b*). The second switch (88*c*, 88*d*) switches connection and disconnection between the series circuit (82*c*; 82*d*) and the third termination circuit (84*f*).

According to this aspect, the first sub-line (82*a*) can be terminated by the first termination circuit (84 to 84*d*) in a case in which the detection is not performed for the frequency band, which is the target of the detection using the first sub-line (82*a*). In addition, in a case in which the detection is not performed for the frequency band that is the target of the detection using the series circuit (82*c*; 82*d*) of the first sub-line (82*a*) and the second sub-line (82*b*), the series circuit (82*c*; 82*d*) can be terminated by the third termination circuit (84*f*). Therefore, the use form of the first sub-line (82*a*) and the second sub-line (82*b*) can be changed depending on the frequency band of the signal transmitted through the main line. Further, the degrees of the difference in the insertion loss of the main line (81) and the phase difference of the high frequency signal can be reduced between a case in which the sub-line (82; 82*a*) is used and a case in which the sub-line (82; 82*a*) is not used, regardless of the frequency band of the signal transmitted through the main line.

A fifth aspect provides the directional coupler (8*c*) according to the fourth aspect, further including a phase-shift circuit (89) connected between the first sub-line (82*a*) and the second sub-line (82*b*).

According to this aspect, in a case in which the series circuit (82*d*) of the first sub-line (82*a*) and the second sub-line (82*b*) is used for the detection, the phase of the signal transmitted through the first sub-line (82*a*) and the phase of the signal transmitted through the second sub-line (82*b*) can be adjusted. Therefore, in a case in which the series circuit (82*d*) of the first sub-line (82*a*) and the second sub-line (82*b*) is used for the detection, the decrease in the insertion loss of the directional coupler (8*c*) can be restrained. Further, even in a case in which the detection is not performed for the frequency band that is the target of the detection using the series circuit (82*d*), the decrease in the insertion loss of the directional coupler (8*c*) can be restrained in the same manner. Therefore, for the frequency band that is the target of the detection using the series circuit (82*d*), the degree of the difference in the insertion loss of the main line (81) can be reduced between a case in which the series circuit (82*d*) is used and a case in which the series circuit (82*d*) is not used.

A sixth aspect provides the directional coupler (8 to 8*c*) according to any one of the first to fifth aspects, further including a multilayer board (10), and an IC chip (13). The multilayer board (10) has at least the main line (81) provided therein. The IC chip includes the first termination circuit (84 to 84*d*; 84*e*) and the switch (88*a*, 88*b*).

According to this aspect, the electromagnetic coupling between the first termination circuits (84 to 84*d*; 84*e*) and the main line (81) can be restrained. In addition, since the first termination circuit (84 to 84*d*; 84*e*) and the switch (88*a*, 88*b*) are close to each other, the influence of the impedance of the path between the first termination circuit (84 to 84*d*; 84*e*) and the switch (88*a*, 88*b*) can be reduced, and the impedance of the first termination circuit (84 to 84*d*; 84*e*) can be adjusted with high accuracy.

A seventh aspect provides the directional coupler (8 to 8*c*) according to the sixth aspect, in which the IC chip (13) overlaps the main line (81) in plan view in a thickness direction (D1) of the multilayer board (10).

According to this aspect, the connection distance between the main line (81) and the IC chip (13) can be reduced. Therefore, the generation of the unnecessary inductor can be suppressed.

An eighth aspect provides a high frequency module (100) including the directional couplers (8 to 8*c*) according to any one of the first to seventh aspects, an antenna terminal (91), a plurality of filters (60 to 64), and an antenna switch (55). The antenna switch (55) switches connection and disconnection between a first signal path leading to the antenna terminal (91) and each of a plurality of second signal paths leading to the plurality of filters (60 to 64).

According to this aspect, the sub-line (82; 82*a*) and the first termination circuit (84 to 84*d*; 84*e*) are not connected to each other in a case in which the signal transmitted through the main line (81) is detected by using the sub-line (82; 82*a*), and the sub-line (82; 82*a*) and the first termination circuit (84 to 84*d*; 84*e*) can be connected to each other in a case in which the sub-line (82; 82*a*) is not used to detect the signal transmitted through the main line (81). Accordingly, the degree of the change in the impedance of the sub-line (82; 82*a*) for the signal transmitted through the main line (81) can be suppressed regardless of whether or not the external circuit is connected to the sub-line (82; 82*a*). Therefore, the degrees of the change in the insertion loss of the main line (81) and the phase change of the signal transmitted through the main line (81) depending on whether or not the sub-line (82; 82*a*) is used can be reduced.

A ninth aspect provides the high frequency module (100) according to the eighth aspect, in which the antenna switch (55) is integral with the switch (88*a*, 88*b*) of the directional coupler (8 to 8*c*).

According to this aspect, the size of the high frequency module (100) can be reduced.

A tenth aspect provides a communication device (300) including the high frequency module (100) according to the eighth or ninth aspect, and a signal processing circuit (301). The signal processing circuit (301) is connected to the high frequency module (100) and performs signal processing on a high frequency signal According to this aspect, the sub-line (82; 82*a*) and the first termination circuit (84 to 84*d*; 84*e*) are not connected to each other in a case in which the signal transmitted through the main line (81) is detected by using the sub-line (82; 82*a*), and the sub-line (82; 82*a*) and the first termination circuit (84 to 84*d*; 84*e*) can be connected to each other in a case in which the sub-line (82; 82*a*) is not used to detect the signal transmitted through the main line (81). Accordingly, the degree of the change in the impedance of the sub-line (82; 82*a*) for the signal transmitted through the main line (81) can be suppressed regardless of whether or not the external circuit is connected to the sub-line (82; 82*a*). Therefore, the degrees of the change in the insertion loss of the main line (81) and the phase change of the signal transmitted through the main line (81) depending on whether or not the sub-line (82; 82*a*) is used can be reduced.

REFERENCE SIGNS LIST

8, 8*a*, 8*b*, 8*c* directional coupler
81 main line
811 first end
812 second end
82 sub-line
821 first end
822 second end
82*a* first sub-line (sub-line)
821*a* first end
822*a* second end
82*b* second sub-line (sub-line)
821*b* first end
822*b* second end
82*c* sub-line (series circuit)
82*d* sub-line (series circuit)
83 second termination circuit
831 capacitor
832 resistor
833 switch
834 switch
835 switch
84, 84*a*, 84*b*, 84*c*, 84*d*, 84*e* first termination circuit
841, 841*a*, 841*b*, 841*c*, 841*d* first circuit
8411 first end (third end)
8412 second end (fourth end)
842, 842*a*, 842*b*, 842*c*, 842*d* second circuit
8421 first end (fifth end)
8422 second end (sixth end)
8431 resistor
8432 capacitor
8433 inductor
8434 variable resistor
8435 variable capacitor
8436 variable inductor
8437 resistor
84*f* third termination circuit

844 third circuit
8441 first end
8442 second end
845 fourth circuit
8451 first end
8452 second end
85*a* first changeover switch
851 terminal
852 terminal
85*b* second changeover switch
853 terminal
854 terminal
85*c* seventh changeover switch
855 terminal
856 terminal
85*d* eighth changeover switch
857 terminal
858 terminal
86*a* third changeover switch
861 terminal
862 terminal
86*b* fourth changeover switch
863 terminal
864 terminal
87 connection terminal
871 first connection terminal
872 second connection terminal
873 third connection terminal
88*a* fifth changeover switch (switch, first switch)
881 terminal
882 terminal
88*b* sixth changeover switch (switch, first switch)
883 terminal
884 terminal
88*c* ninth changeover switch (second switch)
885 terminal
886 terminal
88*d* tenth changeover switch (second switch)
887 terminal
888 terminal
89, 89*a*, 89*b* phase-shift circuit
891 first end
892 second end
893 inductor
8931 inductor
8941 capacitor
8942 capacitor
8943 capacitor
8951 variable capacitor
8952 variable capacitor
10 mounting board (multilayer board)
10*a* first layer
10*b* second layer
10*c* third layer
10*d* fourth layer
10*e* fifth layer
11 first power amplifier
12 second power amplifier
13 IC chip
16 first resin layer
17 metal electrode layer
21 first low noise amplifier
22 second low noise amplifier
31 first output matching circuit
32 second output matching circuit
41 first input matching circuit
42 second input matching circuit
51 first switch
510 common terminal
511 selection terminal
512 selection terminal
52 second switch
520 common terminal
521 selection terminal
522 selection terminal
53 third switch
530 common terminal
531 selection terminal
532 selection terminal
54 fourth switch
540 common terminal
541 selection terminal
542 selection terminal
55 fifth switch (antenna switch)
550 common terminal
551 selection terminal
552 selection terminal
553 selection terminal
554 selection terminal
555 selection terminal
556 selection terminal
60 filter
601 filter
602 filter
61 filter
611 transmission filter
612 reception filter
62 filter
621 transmission filter
622 reception filter
63 filter
631 transmission filter
632 reception filter
64 filter
641 transmission filter
642 reception filter
71 matching circuit
72 matching circuit
73 matching circuit
74 matching circuit
9 external connection terminal
91 antenna terminal
92 signal input terminal
93 signal input terminal
94 signal output terminal
95 signal output terminal
96 coupling terminal
100 high frequency module
101 first main surface
102 second main surface
103 terminal
104 terminal
105 terminal
106 terminal
300 communication device
301 signal processing circuit
302 RF signal processing circuit
303 baseband signal processing circuit
310 antenna
211 data
212 data
221 data
222 data
D1 thickness direction

The invention claimed is:

1. A directional coupler further comprising:

a main line;

a first sub-line having a first end and a second end;

a first termination circuit and a second termination circuit configured to terminate the first end and the second end of the first sub-line, respectively;

a first switch configured to selectively connect the first sub-line and the first termination circuit;

a second sub-line that is connected in series with the first sub-line, the first sub-line and the second sub-line constituting a series circuit;

a third termination circuit;

a second switch; and a phase-shift circuit that is connected between the first sub-line and the second sub-line, wherein the third termination circuit is connected to the series circuit, and wherein the second switch is configured to selectively connect the series circuit and the third termination circuit.

2. A directional coupler comprising:

a main line;

a first sub-line having a first end and a second end;

a first termination circuit and a second termination circuit configured to terminate the first end and the second end of the first sub-line, respectively;

a first switch configured to selectively connect the first sub-line and the first termination circuit;

a multilayer board having at least the main line therein; and an integrated circuit (IC) chip comprising the first termination circuit and the first switch, wherein the IC chip overlaps the main line in a plan view of the multilayer board.

3. A directional coupler comprising:

a main line;

a first sub-line having a first end and a second end;

a first termination circuit and a second termination circuit configured to terminate the first end and the second end of the first sub-line, respectively; and a first switch configured to selectively connect the first sub-line and the first termination circuit, wherein the first termination circuit comprises:

a first circuit having a third end and a fourth end, and a second circuit having a fifth end and a sixth end, wherein the third end of the first circuit is connected to the first end of the first sub-line, and the fourth end of the first circuit is connected to ground, and wherein the fifth end of the second circuit is connected to the second end of the first sub-line, and the sixth end of the second circuit is connected to ground.

4. The directional coupler according to claim 3, further comprising:

a second sub-line that is connected in series with the first sub-line, the first sub-line and the second sub-line constituting a series circuit;

a third termination circuit; and a second switch, wherein the third termination circuit is connected to the series circuit, and wherein the second switch is configured to selectively connect the series circuit and the third termination circuit.

5. The directional coupler according to claim 3, wherein the first termination circuit and the second termination circuit each comprise a variable resistor, a variable capacitor, or a variable inductor.

6. The directional coupler according to claim 3, further comprising:

a multilayer board having at least the main line therein; and an integrated circuit (IC) chip comprising the first termination circuit and the first switch.

7. A high frequency module comprising:

the directional coupler according to claim 3;

an antenna terminal;

a plurality of filters; and an antenna switch configured to selectively connect a first signal path leading to the antenna terminal and each of a plurality of second signal paths leading to the plurality of filters.

8. The high frequency module according to claim 7, wherein the antenna switch is integral with the first switch of the directional coupler.

9. A communication device comprising:

the high frequency module according to claim 7; and a signal processing circuit that is connected to the high frequency module and configured to perform signal processing on a high frequency signal.

* * * * *